United States Patent
Campbell et al.

(10) Patent No.: US 10,778,755 B1
(45) Date of Patent: Sep. 15, 2020

(54) METHODS AND SYSTEMS FOR MULTI-ACCESS EDGE SELECTION BASED ON PERFORMANCE METRICS IN A COMMUNICATION NETWORK

(71) Applicant: Verizon Patent and Licensing Inc., Arlington, VA (US)

(72) Inventors: Kirk Campbell, Long Valley, NJ (US); Ravi Sharma, Freehold, NJ (US); Raghuram Parvataneni, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/398,578

(22) Filed: Apr. 30, 2019

(51) Int. Cl.
*H04L 29/08* (2006.01)
*H04L 12/813* (2013.01)
*H04W 24/02* (2009.01)

(52) U.S. Cl.
CPC ............ *H04L 67/101* (2013.01); *H04L 47/20* (2013.01); *H04L 67/1021* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2014/0098685 A1* | 4/2014 | Shattil | H04L 67/1014 370/252 |
| 2016/0261493 A1* | 9/2016 | Li | H04L 43/50 |

* cited by examiner

*Primary Examiner* — Esther B. Henderson

(57) ABSTRACT

An exemplary edge compute orchestration system that is communicatively coupled with a set of edge compute nodes in a communication network receives a performance test assignment request generated by a user equipment ("UE") device coupled to the network. In response, the system assigns the UE device to perform a performance test to detect a performance metric for a particular edge compute node selected from the set of edge compute nodes. Subsequently, the system accesses performance data including the performance metric and geolocation data corresponding to the performance metric and representative of a geolocation of the UE device during the performance of the performance test. The system integrates the performance data into a geolocation-indexed performance dataset representative of detected performance metrics, indexed by geolocation for the communication network. Corresponding systems and methods are also disclosed.

20 Claims, 11 Drawing Sheets

Aggregated Performance Data
700

| Test # | UE Device ID # | Location | Measured Latency | Test Timestamp |
|---|---|---|---|---|
| 1 | 1001 | (x1, y1) | 23 ms | 1:17:04 4/18/19 |
| 2 | 1002 | (x1, y1) | 22 ms | 4:59:02 4/18/19 |
| 3 | 1003 | (x1, y1) | 23 ms | 6:38:43 4/18/19 |
| 4 | 1001 | (x2, y2) | 4 ms | 8:17:50 4/18/19 |
| 5 | 1004 | (x3, y3) | 12 ms | 9:54:21 4/18/19 |
| 6 | 1005 | (x3, y3) | 13 ms | 10:32:18 4/18/19 |
| 7 | 1006 | (x4, y4) | 33 ms | 11:47:07 4/18/19 |
| 8 | 1001 | (x4, y4) | 30 ms | 11:37:39 4/18/19 |
| 9 | 1007 | (x5, y5) | 27 ms | 13:21:53 4/18/19 |
| 10 | 1008 | (x6, y6) | 10 ms | 15:40:34 4/18/19 |
| 11 | 1009 | (x7, y7) | 8 ms | 16:22:41 4/18/19 |
| 12 | 1002 | (x7, y7) | 19 ms | 19:11:06 4/18/19 |
| 13 | 1003 | (x7, y7) | 10 ms | 23:24:44 4/18/19 |
| 14 | 1004 | (x7, y7) | 9 ms | 06:19:12 4/19/19 |
| ... | | | | |

Edge Compute Node ID
Edge Compute Node Metadata

Fig. 7

METHODS AND SYSTEMS FOR MULTI-ACCESS EDGE SELECTION BASED ON PERFORMANCE METRICS IN A COMMUNICATION NETWORK

BACKGROUND INFORMATION

The popularity of mobile devices and networked computing has grown immensely in recent years. As a result, large communication networks (e.g., national carrier networks, mobile phone networks, mobile data networks, etc.) continue to develop and provide network and communication services to millions of user equipment ("UE") devices such as mobile devices, stationary computing devices, Internet of Things ("IoT") devices, and so forth.

To help UE devices perform significant computing tasks efficiently and effectively, network service providers have employed distributed computing architectures in which UE devices work cooperatively with more powerful computing resources to which the UE devices are networked. For example, multi-access or mobile edge computing ("MEC") technology and other similar technologies have been used to allow UE devices to interoperate with network-edge-deployed computing resources (e.g., servers and/or other resources of the communication network that are located in relatively close physical proximity to the UE devices) to enable distributed computing between the UE devices and the network-edge-deployed resources with minimal latency.

For various use cases (including, but not limited to, selecting which edge resources are to be assigned to perform an edge compute task for a particular UE device located at a particular geolocation), it would be useful to have effective and efficient access to performance metric data for various geolocations in a communication network.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 illustrates exemplary aggregated performance data accessed from an exemplary edge compute node according to principles described herein.

DETAILED DESCRIPTION OF PREFERRED EMBODIMENTS

Figure 1:
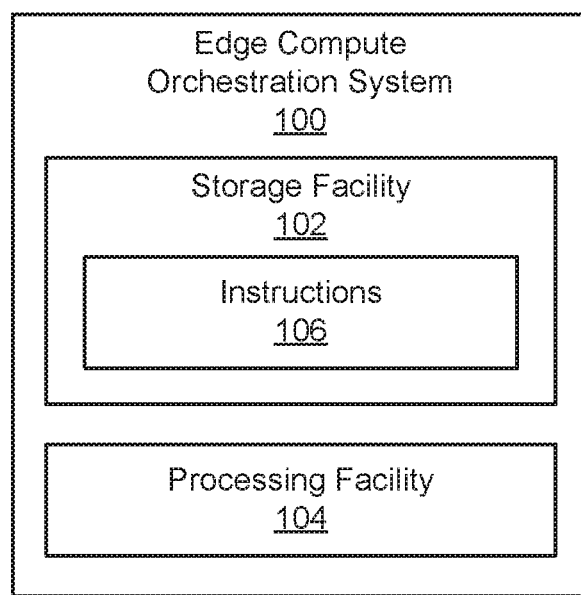
FIG. 1 illustrates an exemplary edge compute orchestration system for generating and managing multi-access edge computing performance data according to principles described herein.

Methods and systems for generating and managing multi-access edge computing performance data are described herein. For example, by generating and managing multi-access edge computing performance data in the ways described herein, multi-access edge selection based on performance metrics in a communication network may be performed in a more effective, efficient, and intelligent way.

As networked and mobile computing continues to grow in the manner described above, network service providers and others continue developing and improving distributed computing technologies whereby user equipment ("UE") devices having relatively modest computing resources interoperate with network-edge-deployed computing systems having more significant resources to more efficiently and effectively perform processing-intensive tasks with low latency. For example, applications involving real-time control systems, dynamic media transcoding, procedural generation of extended reality or gaming content, and/or various other technologies dependent on both processing requirements and latency requirements being met all may be well-served by distributed computing technologies described herein.

As will be described in more detail below, certain implementations of such technologies may involve a Multi-Access edge compute orchestration system and a UE device (e.g., a test UE device) that are both communicatively coupled with a set of edge compute nodes in a communication network. Methods and systems described herein define how the edge compute orchestration system and the test UE device may interoperate to generate and manage multi-access edge computing performance data and use that performance data (including various types of performance metrics included therein) to generate a geolocation-indexed performance dataset that may be used for various application including, for example, multi-access edge selection for a communication network based on the performance metrics included in the performance data. More specifically, methods and systems described herein may facilitate the edge compute orchestration system in making decisions about which edge compute nodes are to be assigned to perform edge compute tasks associated with many UE devices including the test UE device and other UE devices (e.g., non-test UE devices). As such, these methods and systems may be useful in the creation of an effective, efficient, and secure edge computing implementation. Geolocation-indexed performance datasets generated in accordance with methods and systems described herein may also serve other purposes and be used in other types of applications, as will be described in more detail below.

An exemplary implementation of the edge compute orchestration system may be configured to perform at least some of the following operations. The edge compute orchestration system may receive a performance test assignment request generated by a UE device (e.g., a test UE device) that is communicatively coupled to the communication network. In response to the performance test assignment request, the edge compute orchestration system may provide, to the UE device, a performance test assignment that assigns the UE device to perform a performance test to detect a performance metric for a particular edge compute node (or, in some examples, a plurality of such edge compute nodes) selected from the set of edge compute nodes. Subsequent to the providing of the performance test assignment and to the performance of the tests by the UE device, the edge compute orchestration system may access (e.g., from the edge compute node) performance data aggregated by the particular edge compute node. For example, the performance data may include the performance metric and geolocation data corresponding to the performance metric and representative of a geolocation of the UE device during the performance of the performance test. The performance data may further include any other data as may serve a particular implementation. Based on the performance data, the edge compute orchestration system may integrate the accessed performance data into a geolocation-indexed performance dataset representative of detected performance metrics, indexed by geolocation, for the communication network. For example, the geolocation-indexed performance dataset may be managed and maintained by the edge compute orchestration system, and may be associated with (e.g., may incorporate data for) a geographic area covered by the communication network.

In a similar manner, an exemplary implementation of the UE device (e.g., the test UE device) may be configured to perform at least some of the following operations. The UE device may provide a performance test assignment request to the edge compute orchestration system, and, in response to the performance test assignment request, receive a performance test assignment that assigns the UE device to perform a performance test to detect a performance metric for a particular edge compute node (or plurality of edge compute nodes in certain examples) selected from the set of edge compute nodes. In accordance with the performance test assignment, the UE device may perform the performance test to detect the performance metric for the particular edge compute node. For example, the UE device may perform the test when the UE device is located at a particular geolocation. In response to the performing of the performance test, the UE device may provide performance data to the particular edge compute node. The performance data may include, for instance, the performance metric and geolocation data corresponding to the performance metric and representative of the particular geolocation at which the UE device was located during the performing of the performance test. As described above, the performance data may be configured to be integrated, by the edge compute orchestration system, into a geolocation-indexed performance dataset managed by the edge compute orchestration system and associated with a geographic area covered by the communication network. Specifically, as mentioned, the geolocation-indexed performance dataset may be representative of detected performance metrics, indexed by geolocation, for the communication network.

Methods and systems described herein for generating and managing multi-access edge computing performance data may provide various advantages and benefits. For example, by generating and managing a geolocation-indexed performance dataset representative of detected performance metrics that are indexable by geolocation, an edge compute orchestration system may effectively balance competing goals of node performance and node efficiency when assigning edge compute tasks and resources. Specifically, as will be described in more detail below, the edge compute orchestration system may assign a given edge compute task not only to an edge compute node that is capable of meeting performance requirements associated with the edge compute task, but also that is configured to do so in an efficient manner. In this way, efficiency of the communication network may be increased while deployment and maintenance costs associated with the communication network may be reduced, thus benefiting both the network service provider and network users.

Along with providing such benefits to use cases related to effective and efficient assigning of tasks to edge compute nodes, geolocation-indexed performance datasets indicative of detected performance metrics for the communication network generated in accordance with methods and systems described herein may further benefit other use cases as well. For example, such a geolocation-indexed performance dataset may provide valuable information to a mobile application developer, who may use the geolocation-indexed performance dataset to determine where a particular mobile application can be expected to function properly or not function properly, or where the mobile application functions best. As will be described in more detail below, this information may be useful in informing decisions about how to roll out marketing campaigns for the mobile application (e.g., which cities to invest in marketing) and/or make decisions about how to improve the mobile application to function as well as possible for target customers in different geographies.

As another exemplary use case that may benefit from methods and systems described herein, detected performance metrics (e.g., stored in a geolocation-indexed performance dataset structure as described herein) could be useful to a network service provider in determining where the communication network performs well and where there is room for improvement. In this way, the network service provider may be guided by actual data as resource deployment decisions are made in accordance with planning constraints. Accordingly, by generating and managing multi-access edge computing performance data as described herein, methods and systems described herein may provide valuable information both to facilitate automatic systems in making real-time assignments, and to provide human decision makers with valuable insights for longer-term strategic planning.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary edge compute orchestration system 100 ("system 100") for generating and managing multi-access edge computing performance data. Specifically, as shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with generating and managing multi-access edge computing performance data. For example, processing facility 104 may be configured to receive a performance test assignment request generated by a UE device communicatively coupled to a communication network to which system 100 is also communicatively coupled and that includes a set of edge compute nodes. In response to the performance test assignment request, processing facility 104 may provide a performance test assignment to the UE device. For example, the performance test assignment provided by processing facility 104 may assign the UE device to perform a performance test to detect a performance metric for a particular edge compute node selected from the set of edge compute nodes, or in certain examples, to perform a plurality of performance tests to detect a respective performance metric for a selected subset of the set of edge compute nodes.

Subsequent to providing the performance test assignment (and subsequent to the assigned performance tests being performed), processing facility 104 may access performance data aggregated by the particular edge compute node or by the selected subset of edge compute nodes. For example, each of the edge compute nodes in the set of edge compute nodes may be configured to aggregate performance data associated with various performance tests (e.g., performed by various UE devices) that target the edge compute node. Periodically, each edge compute node may then provide this aggregated performance data to system 100, thereby allowing processing facility 104 to access the data. The performance data aggregated by the edge compute nodes and accessed by processing facility 104 may include the performance metric detected by the performance of the performance test (e.g., test results generated by the UE device with respect to the particular edge compute node). The performance data may also include geolocation data corresponding to the performance metric. Specifically, the geolocation data may be representative of a geolocation of the UE device during the performance of the performance test. The performance data may further include any other data associated with the performance test as may serve a particular implementation.

Based on the accessed performance data, processing facility 104 may integrate the accessed performance data into a geolocation-indexed performance dataset associated with a geographic area covered by the communication network. For example, as will be described in more detail below, the geolocation-indexed performance dataset may be representative of detected performance metrics (e.g., detected latency metrics, detected processing performance metrics, etc.) for the communication network at various geolocations in the geographic area. As such, the geolocation-indexed performance dataset may be indexed by geolocation and thus used for any of the use cases described herein (or for other suitable use cases) to provide information about how well the communication network can be expected to perform with respect to particular geolocations in the geographic area covered by the communication network. In some examples, the geolocation-indexed performance dataset may also provide information about how the communication network can be expected to perform with respect to other circumstances affecting network performance for UE devices, such as the time of day, week, or year, or other suitable factors.

As mentioned above, system 100 may be configured to generate and manage multi-access edge computing performance data by interoperating with a UE device that generates the performance test assignment request, receives the performance test assignment, performs the assigned performance tests to target the assigned edge compute nodes, and so forth.

Figure 2:
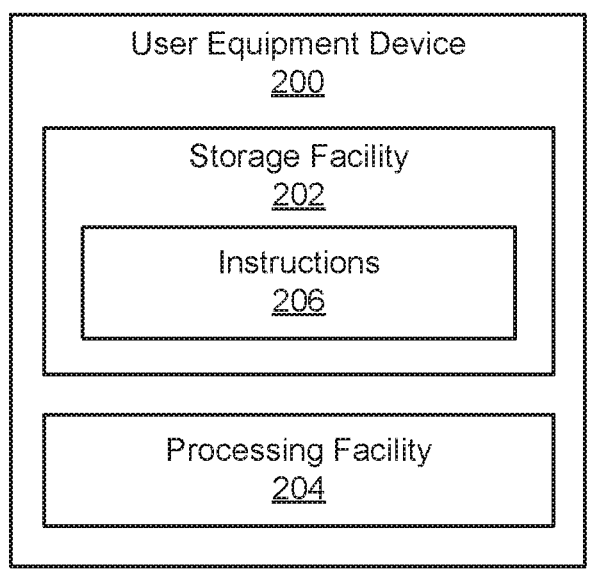
FIG. 2 illustrates an exemplary user equipment ("UE") device for generating and managing multi-access edge computing performance data according to principles described herein.

To illustrate an example of such a UE device, FIG. 2 shows an exemplary UE device 200 for generating and managing multi-access edge computing performance data by helping determine the performance metrics for various geolocations within a geographic area covered by the communication network. As shown in the high-level block diagram of FIG. 2, UE device 200 may be implemented as a computing device having similar high-level computing components as system 100. Specifically, as shown, UE device 200 may include, without limitation, a storage facility 202 and a processing facility 204 selectively and communicatively coupled to one another. As with facilities 102 and 104 of system 100, facilities 202 and 204 may each include or be implemented by hardware and/or software components (e.g., processors, memories, communication interfaces, instructions stored in memory for execution by the processors, etc.), and, in some examples, may be distributed between multiple devices and/or multiple locations as may serve a particular implementation.

In some examples, UE device 200 may be implemented by or referred to as a "test" UE device. In this way, UE device 200, which is configured to accept performance test assignments to help generate the performance data that will ultimately be integrated into the geolocation-indexed performance dataset, may be differentiated from other UE devices that may be communicatively coupled to a particular communication network, but that are not configured to request or perform test assignments to help to determine the performance metrics for the various geolocations within the geographic area.

Like standard (i.e., non-test) UE devices coupled to the communication network, test UE device 200 may be implemented by any suitable computing device that is configured to be used by an end user directly, or that is otherwise deployed or embedded in objects for indirect use by consumers, researchers, or others (e.g., for Internet of Things ("IoT") applications, etc.). For example, standard UE devices and test UE device 200 alike may be implemented by or include mobile devices (e.g., smart phones, tablet devices, laptop computers, etc.), stationary devices (e.g., desktop computers, intelligent home systems, etc.), IoT devices (e.g., smart appliances, smart automobiles, smart sensors used for research purposes, etc.), and so forth. In some examples, all of the UE devices on the communication network (e.g., thousands or millions of UE devices in the example of certain nationwide carrier networks) may implement test UE devices. In other examples, however, various considerations such as network security, user privacy, and other considerations may make it inconvenient or otherwise non-ideal for all UE devices owned by network subscribers to be used as test UE devices such as UE device 200. Accordingly, in these examples, each test UE device 200 may be a UE device owned by, or more closely associated with, the network service provider. For example, UE device 200 may be implemented by a mobile device (e.g., phone, tablet, etc.) issued to a field technician or other employee of the network service provider, implemented within a special device used in drive-by network testing, implemented by circuitry embedded into vehicles owned by the network service provider, implemented by stationary devices disposed at fixed locations associated with the network service provider (e.g., brick and mortar stores that sell devices and services offered by the network service provider), implemented by or within other mobile or stationary properties of the network service provider, or implemented in any other way and by any other device as may serve a particular implementation.

In some examples, UE device 200 may be implemented by standard UE devices that are owned and carried by network users (e.g., subscribers to services provided by the network service provider). Because there may be many such UE devices in use on the communication network, a significant amount of testing may be performed by these UE devices, leading to a large amount of performance data and, ultimately, a useful, accurate, data-rich geolocation-indexed performance dataset for the communication network.

Facilities 202 and 204 within UE device 200 will now be described in more detail. Similar to storage facility 102 described above, storage facility 202 may maintain (e.g., store) executable data used by processing facility 204 to perform any of the functionality described herein. For example, storage facility 202 may store instructions 206 that may be executed by processing facility 204. Instructions 206 may be executed by processing facility 204 to perform any of the functionality described herein, and may be implemented by any suitable application, software, code, and/or other executable data instance. Additionally, storage facility 202 may also maintain any other data accessed, managed, used, and/or transmitted by processing facility 204 in a particular implementation.

As with processing facility 104 described above, processing facility 204 may be configured to perform (e.g., execute instructions 206 stored in storage facility 202 to perform) various functions associated with generating multi-access edge computing performance data for various geolocations within the geographic area covered by the communication network. However, facility 204 will perform such functions from the UE device perspective, rather than the edge compute orchestration system perspective described above in relation to facility 104. More specifically, for example, processing facility 204 may be configured to generate and provide, to system 100, the performance test assignment request. In response to this providing, processing facility 204 may also receive the performance test assignment that assigns UE device 200 to perform the performance test to detect the performance metric for the particular edge compute node (or plurality of edge compute nodes) selected from the set of edge compute nodes.

In accordance with the performance test assignment and when UE device 200 is located at a particular geolocation, processing facility 204 may perform the performance test to detect the performance metric for the particular edge compute node (or to detect the performance metrics for the subset of edge compute nodes in certain examples). In response to performing the tests, processing facility 204 may provide to the particular edge compute node (or subset of edge compute nodes) the performance data described above to include the performance metric and the geolocation data representative of the particular geolocation at which UE device 200 was located during the performing of the performance test. As described above, the performance data may be configured to be used by system 100 to generate and update a geolocation-indexed performance dataset by, for example, integrating the performance data into the geolocation-indexed performance dataset to represent the detected performance metrics, indexed by geolocation, for the communication network.

In some examples, either or both of system 100 and UE device 200 may be configured to operate in real time so as to receive, access, manage, and/or process the data described above (e.g., performance test assignment requests, performance test assignments, performance data including performance metrics and geolocation data, etc.) dynamically as the data is generated or otherwise becomes available. As a result, system 100 may generate, update, and/or otherwise manage the geolocation-indexed performance dataset based on timely, real-time data, as well as based on historical data. As used herein, operations may be performed in "real time" when they are performed immediately and without undue delay. In some examples, real-time data processing operations may be performed in relation to data that is highly dynamic and time sensitive (i.e., data that becomes irrelevant after a relatively short time). As such, real-time operations may determine performance metrics for various geolocations within a geographic area covered by a communication network while the data upon which the metrics are determined continues to be relevant and up-to-date.

Figure 3:
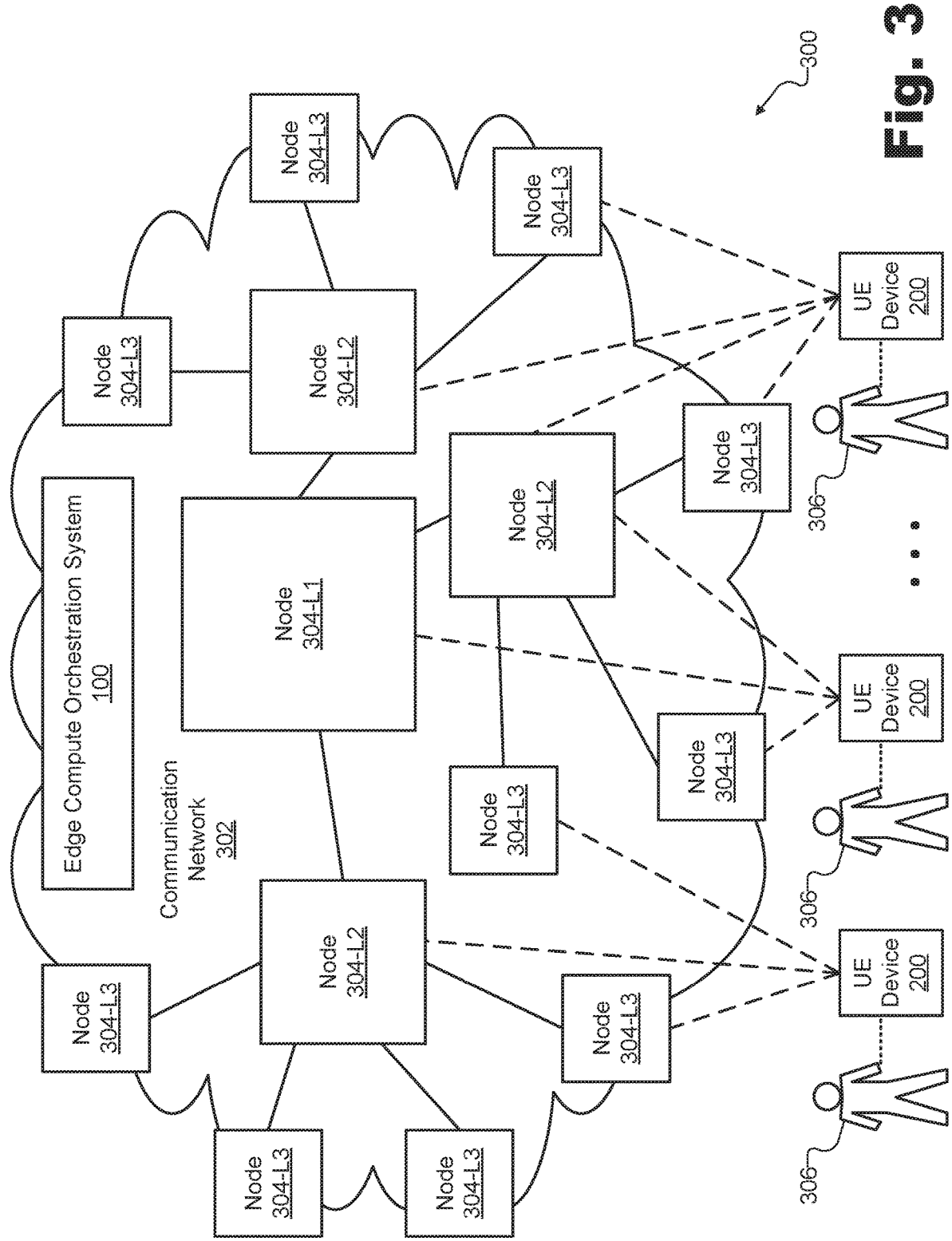
FIG. 3 illustrates an exemplary configuration within which exemplary implementations of the edge compute orchestration system of FIG. 1 and the UE device of FIG. 2 may operate according to principles described herein.

FIG. 3 illustrates an exemplary configuration 300 within which exemplary implementations of system 100 and UE device 200 may operate. Specifically, as shown in configuration 300, system 100 is associated with a communication network 302 that includes a plurality of edge compute nodes 304 ("nodes" 304-L1, 304-L2, and 304-L3). System 100 may be implemented by computing resources that are communicatively coupled to and/or interconnected by way of communication network 302, which may connect to or be at least partially implemented by nodes 304. Configuration 300 also shows a few instances of UE device 200 communicatively coupled to communication network 302 (e.g., by way of different nodes 304) and each associated with (e.g., used by) a respective user 306. Each of the components of configuration 300 shown in FIG. 3 will now be described in more detail.

Communication network 302 may include and/or be implemented by any type of computing, communications, and/or networking technologies as may serve to distribute data between UE devices 200 or between a UE device 200 and another computing system such as one of nodes 304 and/or another computing system not explicitly shown in configuration 300. Communication network 302 may include or be implemented by a provider-specific wired or wireless network (e.g., a cable or satellite carrier network, a mobile telephone network, a traditional telephone network, a broadband cellular data network, etc.), the Internet, a wide area network, a content delivery network, and/or any other suitable network or networks. As such, data may be communicated over communication network 302 using any suitable communication technologies, devices, media, and/or protocols implemented or employed by communication network 302 to serve a particular implementation.

System 100, which was described above in relation to FIG. 1, may be configured in any suitable manner with respect to communication network 302 and the other components shown in configuration 300. For example, system 100 may be implemented by computing resources included within a particular node 304, may be distributed across computing resources of multiple nodes 304, may be implemented by computing resources integrated or communicatively coupled with communication network 302 but independent from any particular node 304, or may be implemented in any other manner or by any other computing resources as may serve a particular implementation. In certain examples, system 100 may be deployed in a centralized location using efficient, centralized computing resources. For instance, if communication network 302 covers a large geographical area (e.g., all or a large portion of the United States) system 100 may be implemented by various powerful servers at a centralized data center that may or may not also host an edge compute node (e.g., one of nodes 304-L1, 304-L2, etc.).

Because system 100 is communicatively coupled to communication network 302, system 100 may communicate over the network with nodes 304, UE devices 200, and/or additional components not explicitly shown in configuration 300. In some implementations (e.g., implementations in which communication network 302 covers a particularly large area), multiple edge compute orchestration systems (i.e., multiple instances of system 100 or different implementations thereof) may all be included on communication network 302 and may be in communication with one another to coordinate orchestration efforts described herein for the entire network. In some examples, this plurality of edge compute orchestration systems may be independent from one another, while, in other examples, the edge compute orchestration systems may be configured to share data with one another.

Configuration 300 shows several nodes 304 each labeled and sized in accordance with how many computing resources are included within the node. While a relatively small number of nodes 304 are shown in FIG. 3, it will be understood that a large (e.g., nationwide) communication network may include hundreds or thousands of nodes distributed across the area covered by the communication network. For example, a large communication network may include several nodes 304-L1, hundreds of nodes 304-L2, and thousands of nodes 304-L3.

An edge compute node such as any of nodes 304 will be understood to refer to a discrete set of computing resources (e.g., a server, a set of servers, a data center, etc.) that is associated with a communication network such as communication network 302 and is capable of performing edge compute tasks assigned to the edge compute node. Edge compute nodes are so named not necessarily because every such node is at the "edge" of a network, but because each edge compute node is configured to provide edge compute services associated with edge compute technologies (e.g., MEC technologies, etc.) of a cellular network such as a 5G cellular network or any other suitable cellular network associated with any other suitable generation of technology. Accordingly, in some examples, a node 304 may be owned and maintained by a network service provider such as a cellular carrier company, while, in other examples, a node 304 may be more localized to UE devices 200 such as by being implemented by computing resources on a same local area network with one of UE devices 200 (e.g., by computing resources located within a home or office of the corresponding user 306), or the like.

As mentioned above, differently-sized squares and different labels are used in FIG. 3 to illustrate some different types of nodes 304 that may be included on communication network 302. Specifically, configuration 300 shows, as an example, three different levels L1, L2, and L3 of edge compute nodes labeled as nodes 304-L1, 304-L2 and 304-L3, respectively. While three distinct levels of edge compute nodes are shown and described herein, it will be understood that a wide spectrum of different-sized edge compute nodes (e.g., having a more continuous range of sizes and including more than just the three exemplary levels described herein) may be employed in certain embodiments as may serve those implementations.

One reason that different types of nodes 304 (e.g., nodes associated with different levels, degrees of computing power, ubiquity, etc.) are deployed on communication network 302 is to make possible the balancing of two competing goals that various applications and use cases described herein may share. First, it is desirable for any network-edge-deployed resources at nodes 304 to be able to meet minimum processing requirements and maximum latency requirements for specific edge compute tasks that are assigned to the nodes 304. In theory, this first goal could be accomplished by deploying powerful computing resources to a ubiquitous number of edge compute nodes thoroughly covering the entire geographic footprint of communication network 302 (i.e., to cover every geolocation at which a UE device may possibly be located). Unfortunately, due to cost and logistical realities, it is of course not possible to deploy an infinite number of resources to provide unlimited computing power to UE devices at every possible geolocation. As such, a second goal arises that relates to achieving the illusion of unlimited computing resources in the most efficient and realistic way possible. For example, the second goal may be to deploy and maintain sufficient computing resources to deliver on the processing and latency required of the network in a way that is practical and cost-efficient to implement. This second goal may thus be accomplished by consolidating computing resources to fewer and larger centralized nodes, thus limiting the amount of resources that need to be deployed and maintained at smaller and more localized nodes. As will be described in more detail below, these two goals may both be addressed and achieved by selectively assigning tasks to edge compute nodes in a manner that accounts for node performance (e.g., ensuring that processing and latency parameters are met in accordance with the first goal) while also accounting for node efficiency (e.g., ensuring that more centralized and cost-efficient edge compute nodes are used to the extent possible to limit reliance on more localized and costly edge compute nodes).

By deploying different levels of nodes 304 (e.g., nodes 304-L1 through 304-L3), a network service provider may enable system 100 to select, for performance of a particular edge compute task requested by a particular UE device, an optimal node 304 that is both 1) capable of meeting the processing and latency parameters of the edge compute task, and 2) does not require more inefficient localization of computing resources than is necessary. As will be described in more detail below, system 100 may assign edge compute tasks to be performed by nodes 304 selectively chosen in accordance with a node selection policy that helps balance these competing goals of node performance and node efficiency.

Node performance may refer to latency, processing, and/or other aspects of the computing performance of a particular edge compute node. As such, node performance will be understood to correspond to the first of the two competing goals of distributed computing described above. Optimal node performance is generally achieved when a high degree of processing is accomplished with a low degree of latency. To this end, it is desirable for a node being used to perform an edge compute task to have as many computing resources as possible and to be as local (e.g., geographically proximate) to the UE device as possible. The goal of node performance, however, tends to limit, and to be limited by, an opposing goal of node efficiency.

Node efficiency may refer to efficient usage of computing resources that have been deployed in connection with particular nodes and that continue to require updates, maintenance, and so forth, that may be more or less efficient to perform based on how consolidated the resources are, what percentage of resources are available at any given time, and so forth. Optimal node efficiency is generally achieved when an edge compute node selected to perform a given edge compute task includes a large wealth of computing resources (e.g., parallel processors, large memories and storage resources, etc.) and is thus more efficient to implement, deploy, maintain, and otherwise operate than other capable edge compute nodes would have been if they had been selected to perform the edge compute task. As such, node performance and node efficiency may be said to be balanced in an appropriate, optimal, or ideal manner when edge compute nodes selected for performing edge compute tasks are qualified to meet performance requirements without being needlessly overqualified to do so. For example, as will be described in more detail below, it would be more efficient to assign an edge compute task to a centralized edge compute node (e.g., a relatively low-performance and high-efficiency node) rather than to a localized edge compute node (e.g., a relatively high-performance and low-efficiency node) if the performance provided by either edge compute node is capable of meeting the parameters required by the edge compute task. Even though the more localized edge compute node may be capable of providing better performance (e.g., lower latency), for example, it would be less optimal to assign an edge compute task to the localized edge compute node if the higher-efficiency centralized edge compute node is also capable of satisfying performance parameters associated with the task.

Level 1 nodes (e.g., node 304-L1 in FIG. 3) may be categorized as central edge compute nodes or edge compute nodes that fall into a central edge compute node category. As illustrated by the large size of node 304-L1, central edge compute nodes will be understood to be the largest and most centralized type of edge compute node described herein. For example, node 304-L1 may be implemented by a network equipment center (e.g., a large data center with hundreds or thousands of powerful servers and other computing resources). Node 304-L1 may simultaneously handle millions of edge compute tasks from thousands or millions of UE devices, and may do so in a most efficient manner due to the centralized nature of all the computing resources. However, while the efficiency of performing edge compute tasks on such centralized nodes may be ideal for the goal of node efficiency, node 304-L1 may be located far away (e.g., hundreds of miles) from certain UE devices that the node is configured to serve, thereby necessarily compromising, at least for these UE devices, the node performance goal. For example, the travel-time latency required for certain UE devices to use node 304-L1 may be at least 20-30 ms or about ten times more latency as could be provided by a more localized edge compute node. Because only a few (e.g., less than 100, less than 10, etc.) central edge compute nodes may be included in a large communication network, configuration 300 shows only a single node 304-L1 to be included on communication network 302.

Level 2 nodes (e.g., nodes 304-L2) may be categorized as intermediate edge compute nodes or edge compute nodes that fall into an intermediate edge compute node category. As illustrated by the medium size of nodes 304-L2, intermediate edge compute nodes will be understood to be smaller and less centralized than central edge compute nodes, but still larger and more centralized than local edge compute nodes described below. For example, nodes 304-L2 may be implemented by service aggregation points on communication network 302 (e.g., smaller data centers with many powerful servers and other computing resources but fewer than described above in relation to central edge compute nodes such as node 304-L1). Each node 304-L2 may simultaneously handle thousands of edge compute tasks from hundreds or thousands of UE devices 200, and may do so in a relatively efficient manner, although less efficiently than the central edge compute nodes described above. While the efficiency and cost of performing edge compute tasks on intermediate edge compute nodes such as nodes 304-L2 may be less ideal than the central edge compute nodes for the goal of node efficiency, nodes 304-L2 may advantageously be distributed to be located much closer (e.g., within a hundred miles) to many UE devices 200 that the nodes are configured to serve, thereby providing improvements in the node performance goal over node 304-L1. For example, the travel-time latency required for certain UE devices to use nodes 304-L2 may be around 5-15 ms, which is significantly less than the latency associated with node 304-L1 described above. Because several dozen to a few hundred intermediate edge compute nodes may be included in a large communication network, configuration 300 shows a few nodes 304-L2 to be included on communication network 302.

Level 3 nodes (e.g., nodes 304-L3) may be categorized as local edge compute nodes or edge compute nodes that fall into a local edge compute node category. As illustrated by the small size of nodes 304-L3, local edge compute nodes will be understood to be even smaller and more widely distributed (i.e., more localized to more places) than the intermediate edge compute nodes described above such as nodes 304-L2. For example, nodes 304-L3 may be implemented at centralized radio access network hubs (C-RAN hubs) associated with local cells of a cellular network, and may include computing resources that, while potentially just as capable as resources of central and intermediate edge compute nodes described above in terms of performance, may be fewer in number (e.g., fewer server resources, fewer processor resources, etc.). Each node 304-L3 may simultaneously handle hundreds of edge compute tasks from dozens or hundreds of UE devices 200. The node performance of these tasks may be ideal because of the localized nature of nodes 304-L3 with respect to UE devices 200. For example, nodes 304-L3 may typically be located within just a few miles (e.g., less than about 10 miles, and often within 1 mile) of the UE devices 200 that the nodes are servicing, thereby enabling nodes 304-L3 to have a travel-time latency of just 1-3 ms in some examples, or even less than 1 ms in other examples. As mentioned above, while this low latency is ideal for the goal of node performance, the goal of node efficiency is compromised by excessive use of nodes 304-L3. This is because there may be thousands of nodes 304-L3 deployed in a large communication network, thereby making deployment and maintenance of significant computing resources to every node 304-L3 in every local geography extensive. Because thousands of local edge compute nodes may be included in a large communication network, configuration 300 shows a relatively large number of nodes 304-L3 to be scattered across communication network 302.

As described above, various test UE devices 200 may be communicatively coupled to communication network 302 for use in carrying out performance tests targeting different nodes 304 from various geolocations covered by communication network 302. As described above, there may be many UE devices not shown in FIG. 3 (e.g., standard UE devices associated with subscribers to services provided by communication network 302) that do not necessarily facilitate the performance of such testing. It will be understood, however, that each instance of UE device 200 shown in FIG. 3 and/or described herein is configured to help determine performance metrics for the various geolocations in accordance with the methods and systems described herein. To this end, each of UE devices 200 may be communicatively coupled to communication network 302, such as by being directly coupled to at least one node 304 (e.g., by way of wireless communication), or may be indirectly coupled to at least one node 304 by way of network components of communication network 302 that are not explicitly shown.

Figure 4:
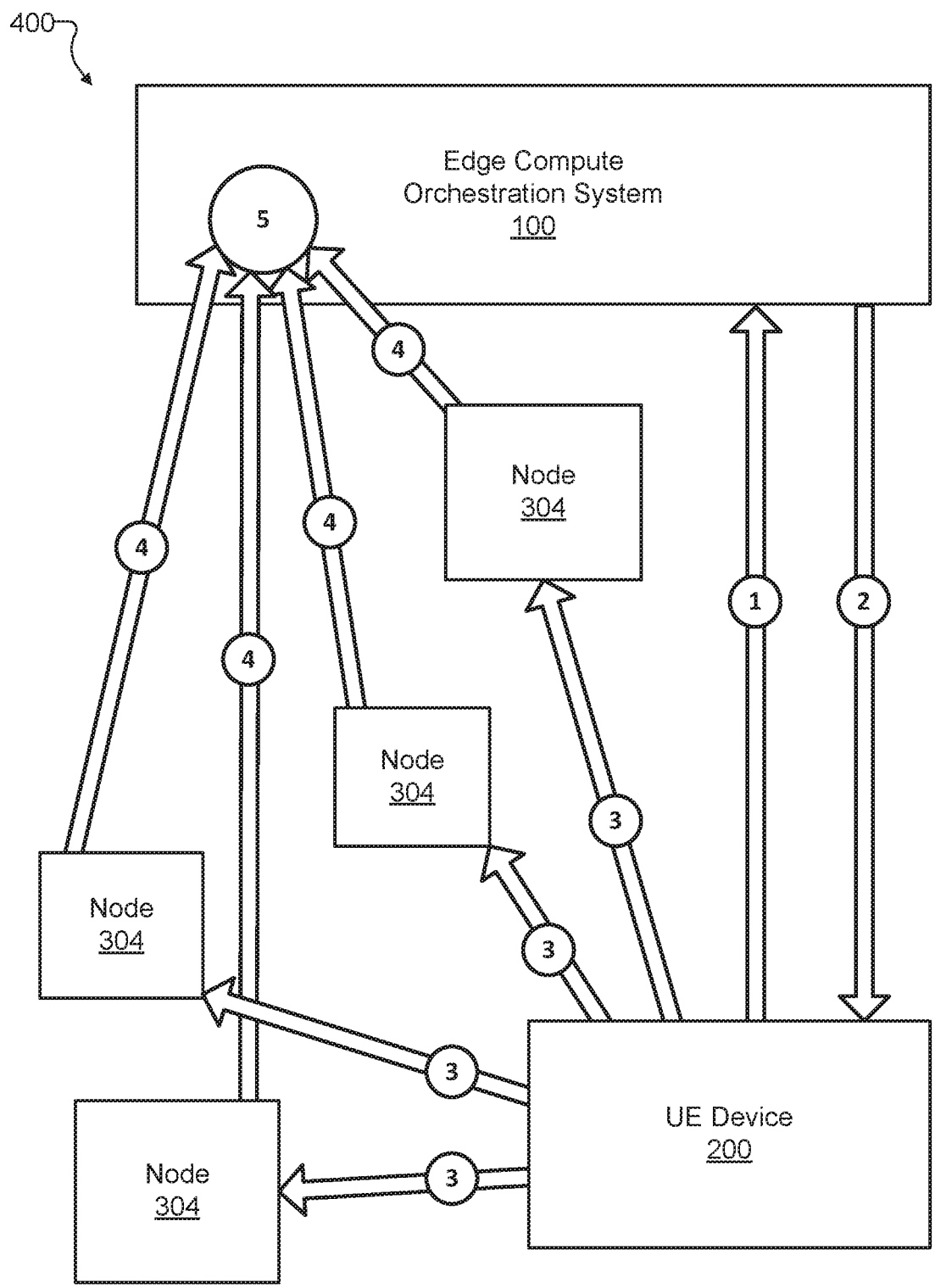
FIG. 4 illustrates an exemplary dataflow including operations that may be performed to generate and manage multi-access edge computing performance data according to principles described herein.

FIG. 4 illustrates a dataflow 400 including exemplary operations that may be performed to generate and manage multi-access edge computing performance data for various geolocations within a geographic area covered by communication network 302. Specifically, as shown, dataflow 400 depicts various components of configuration 300 including system 100, UE device 200, and a few nodes 304, each of which will be understood to represent any type or category of edge compute node such as a node 304-L1, 304-L2, or 304-L3 described above. While communication network 302 is not explicitly shown in FIG. 4, it will be understood that the communications described below to carry out dataflow 400 may utilize communication network 302 in any of the ways described herein.

Dataflow 400 is shown to include a plurality of operations labeled in FIG. 4 as circled numbers 1 through 5 and referred to herein as Operation 1 through Operation 5, respectively. As shown, certain of the operations are illustrated to be associated with an arrow from one of the components to another. Such arrows may represent the movement of data, the providing of instructions, and/or any other suitable influence that one component may exert on another. While the operations of dataflow 400 are numbered in a particular sequence that may be one suitable sequence for the operations to be performed, it will be understood that, in certain examples, dataflow 400 could also be implemented by performing the operations in another suitable order different from the order shown, and/or by performing at least some of the operations concurrently or in parallel with one another, rather than sequentially. Operations 1 through 5 will now be described in detail with reference to the components of FIG. 4, as well as with reference to FIGS. 5 through 8.

Operation 1 is depicted as an arrow from UE device 200 to system 100 that will be understood to represent the providing by UE device 200, and the receiving by system 100, of a performance test assignment request. A performance test assignment request may be implemented as data in any form or format that indicates a request for a performance test assignment. In Operation 1, the performance test assignment request may be generated by UE device 200 and received by system 100 in any suitable way. For example, UE device 200 may generate data representative of the performance test assignment request periodically (e.g., once every 5 minutes, once per hour, etc.) and/or in response to the detection of certain conditions or criteria as will be described in more detail below. The performance test assignment request may be provided to (and received by) system 100 in Operation 1 in any manner as may serve a particular implementation. For example, the performance test assignment request may be transmitted by UE device 200 to system 100 by way of communication network 302 and any technologies or devices (e.g., domain name servers, etc.) as may be included therein. In some examples, Operation 1 will also be understood to include a verification step wherein system 100 analyzes the received performance test assignment request and verifies that UE device 200 meets various qualifications (e.g., registration qualifications, etc.) for requesting the performance test assignment.

Once Operation 1 has been performed, a chain of events may be initiated that includes the performance of the remainder of the operations included in dataflow 400, each of which is described in more detail below. Accordingly, in order to determine performance metrics for a wide variety of geolocations within a geographic area covered by communication network 302, it may be desirable for Operation 1 (and, therefore, the rest of Operations 2 through 5) to be performed repeatedly as the UE device 200 shown in FIG. 4 (as well as various other instances of UE device 200 that may be communicatively coupled to system 100 in the same way) moves about to different geolocations within the geographic area. For example, the providing of the performance test assignment request in Operation 1 may be automatically and periodically repeated as UE device 200 is moved among the various geolocations in the geographic area, based on a set timer (e.g., to make a performance test assignment request every 1 minute, every 5 minutes, every hour, or at any other suitable frequency), based on any detected conditions, and/or based on other criteria as may serve a particular implementation.

Figure 5:
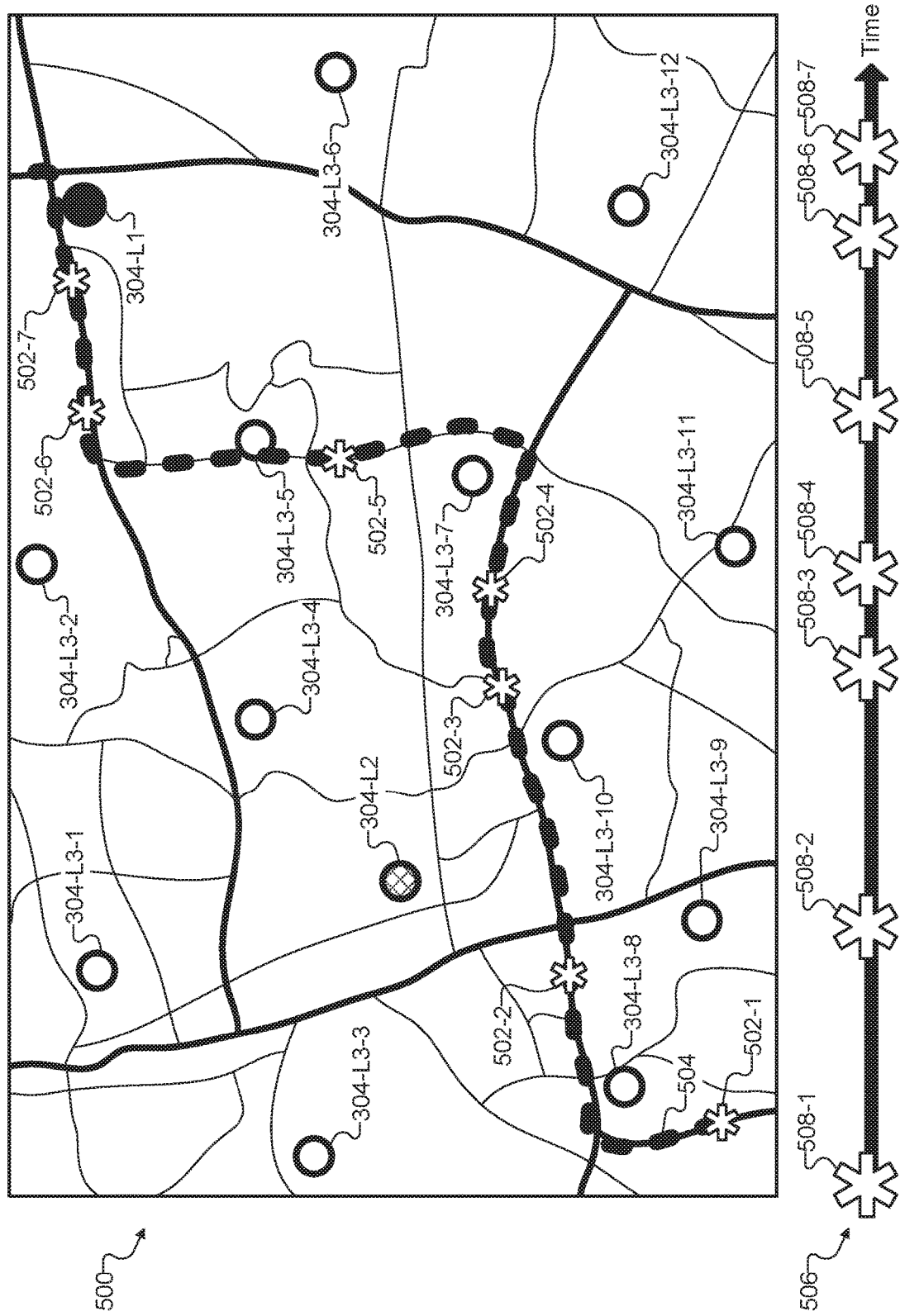
FIG. 5 illustrates an exemplary geographic area that is covered by a communication network and includes various geolocations at which the UE device of FIG. 2 provides a performance test assignment request according to principles described herein.

To illustrate, FIG. 5 shows a map of an exemplary geographic area 500 that is covered by communication network 302, and includes various geolocations 502 (e.g., geolocations 502-1 through 502-7) at which UE device 200 provides performance test assignment requests to system 100. As shown, UE device 200 may move along a path 504 that connects several roads leading a user 306 who is carrying UE device 200 to drive from one corner of geographic area 500 to another. Specifically, the user 306 carrying UE device 200 may start at geolocation 502-1 and drive along the roads indicated by path 504 from geolocation 502-1 to geolocation 502-2, and so forth until reaching geolocation 502-7.

As UE device 200 is moved along path 504 from geolocation 502-1 to geolocation 502-7, it is shown that UE device 200 will move among and between a variety of edge compute nodes 304 that provide edge compute network coverage for the portion of communication network 302 associated with geographic area 500. As shown, one of these nodes 304 is represented by a blackened circular icon and is labeled "304-L1" to indicate that this edge compute node is a central edge compute node. Another one of these nodes 304 is represented by a shaded circular icon and is labeled "304-L2" to indicate that this edge compute node is an intermediate edge compute node. The rest of the nodes 304 shown in geographic area 500 are represented by hollow circular icons and are labeled "304-L3-X" (where "X" represents a reference integer 1 through 12 to allow the twelve nodes 304-L3 depicted to be distinguished in the description below) to indicate that these edge compute nodes are local edge compute nodes.

Below the map of geographic area 500 in FIG. 5, a timeline 506 illustrates times 508 (i.e., times 508-1 through 508-7) which correspond to geolocations 502 (i.e., to geolocations 502-1 through 502-7, respectively). As such, it will be understood, for example, that a first performance test assignment request associated with a first performance of Operation 1 may be provided and received when UE device 200 is located at geolocation 502-1 at time 508-1, a second performance test assignment request associated with a second performance of Operation 1 may be provided and received when UE device 200 is located at geolocation 502-2 at time 508-2, and so forth.

As mentioned above, some instances of Operation 1 (i.e., some instances of when the performance test assignment request is provided by UE device 200 and received by system 100) may be performed at a regular, periodic rate, while other instances of Operation 1 may be performed in response to detected conditions or other criteria. To illustrate, timeline 506 shows that instances of Operation 1 are performed at periodic times 508-1, 508-2, 508-3, 508-5, and 508-7. For example, these times may be understood to occur regularly based on a timer that triggers at a periodic rate such as once every several minutes (e.g., every 5 minutes, every 10 minutes, etc.) or at any other suitable rate.

Timeline 506 also shows that other instances of Operation 1 may be performed at non-periodic times (e.g., between the periodic times) such as times 508-4 and 508-6. UE device 200 may trigger Operation 1 to be performed at these non-periodic times for any reason and/or based on any criteria as may serve a particular implementation. For instance, UE device 200 may trigger Operation 1 to be performed when a particular network condition is detected such as when UE device 200 determines that it is going out of range of one node 304 and/or is coming into range of another node 304, when the geolocation 502 of UE device 200 is determined to have changed by a particular threshold, when a particular node 304 is determined to be supporting a particular amount of network traffic, or any other network condition as may serve a particular implementation. In some examples, UE device 200 may trigger Operation 1 to be performed when UE device 200 determines that the geolocation 502 of UE device 200 is a geolocation 502 that has not been performance tested thoroughly under particular conditions (e.g., at the particular time of day, week, month, or year that it currently is, etc.). For example, a geolocation-indexed performance dataset that is continuously being updated in the ways described herein may lack robust datapoints around a particular geolocation 502 and, for this reason, UE device 200 may be configured to request a performance test assignment from that particular geolocation 502 when UE device 200 is located at that geolocation.

In still other examples, instead of Operation 1 being automatically triggered by UE device 200, a user 306 of UE device 200 (e.g., a field technician or other employee tasked with helping gather data for a robust geolocation-indexed performance dataset) may manually trigger Operation 1 to occur at geolocations in geographic area 500 and/or at certain times on timeline 506 as the user may see fit in accordance with his or her goals and duties.

Returning to FIG. 4, Operation 2 is depicted by an arrow from system 100 to UE device 200 that will be understood to represent the providing by system 100, and the receiving by UE device 200, of a performance test assignment in response to the performance test assignment request that was provided and received in Operation 1. A performance test assignment provided and received in response to a performance test assignment request may be implemented as data in any form or format that indicates an assignment for a UE device to perform one or more performance tests targeting one or more particular edge compute nodes indicated by the assignment. Accordingly, in Operation 2, system 100 may provide a performance test assignment to assign UE device 200 to perform a performance test targeting a particular node 304 from the set of nodes 304 included in communication network 302.

In some examples, instead of just one particular target node 304 being assigned, the performance test assignment of Operation 2 may indicate a plurality of target nodes (e.g., a subset of nodes 304 selected from the set of all nodes 304) upon which performance tests are to be performed. For example, a plurality of performance tests may be assigned to target a plurality of distinct nodes 304 from the set of nodes 304. In this way, as will be described in more detail below, system 100 may access performance data aggregated by several nodes 304 and representative of 1) performance metrics generated as part of a performance of each of the performance tests performed by UE device 200 with respect to each of the selected target nodes 304, and 2) geolocations of UE device 200 during the performance each of the performance tests. Moreover, the assigning of a plurality of performance tests targeting a plurality of nodes 304 may allow for the generating of a geolocation-indexed performance dataset to be based on performance data from each of the performance tests with respect to each of the targeted nodes 304.

Figure 6:
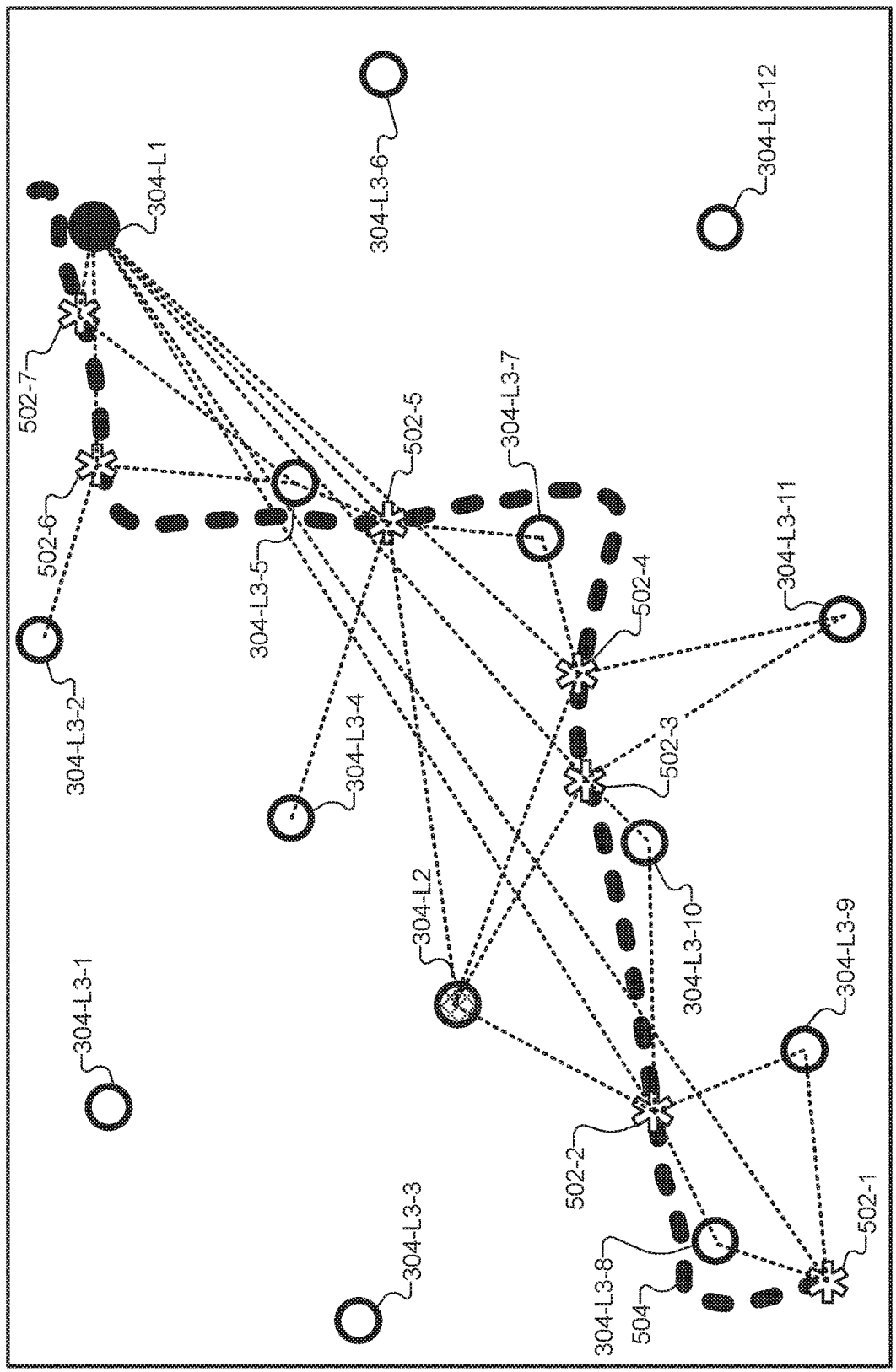
FIG. 6 illustrates exemplary performance test assignments provided to the UE device at the geolocations illustrated in FIG. 5 according to principles described herein.

To illustrate exemplary subsets of nodes 304 that may be assigned in certain performance test assignments of Operation 2, FIG. 6 shows exemplary performance test assignments provided to UE device 200 at geolocations 502 within geographic area 500, described above in relation to FIG. 5. Specifically, as shown in FIG. 6, the same geographic area 500 is depicted with the same geolocations 502, the same path 504, and the same nodes 304. However, geographical details such as roads that were shown in FIG. 5 are omitted in the depiction of geographic area 500 in FIG. 6 in order to more clearly show performance test assignments that may be provided to UE device 200 at each geolocation 502. Specifically, as illustrated by dotted lines connecting each geolocation 502 to a respective plurality of nodes 304, UE device 200 may be assigned, when located at a given geolocation 502, to perform a plurality of performance tests targeting each of the nodes 304 to which the dotted lines from that geolocation 502 connect.

For example, as shown, when UE device 200 is located at geolocation 502-1, a performance test assignment provided and received in Operation 2 may assign UE device 200 to perform a plurality of performance tests targeting nodes 304-L3-8, 304-L3-9, and 304-L1. As another example, when UE device 200 is located at geolocation 502-2, a performance test assignment provided and received in Operation 2 may assign UE device 200 to perform a plurality of performance tests targeting nodes 304-L3-8, 304-L3-9, 304-L3-10, 304-L2, and 304-L1. In other examples illustrated by FIG. 6, when UE device 200 is located at other geolocations 502 (e.g., geolocations 502-3 through 502-7), different performance test assignments provided and received in Operation 2 may assign UE device 200 to perform different pluralities of performance tests targeting the nodes indicated by the dotted lines branching out from the respective geolocations 502 in FIG. 6.

For any particular geolocation 502, system 100 may assign one or more target nodes 304 as nodes for which a performance test is to be performed and a performance metric detected (i.e., as a result of the performance test). System 100 determine which node 304, or which subset of nodes 304, to assign in any manner and/or based on any criteria as may serve a particular implementation. For example, system 100 may be configured to assign performance tests targeting nodes 304 from a variety of edge compute node categories to gather data as to what performance (e.g., latency performance, etc.) may be expected for UE devices at the geolocation 502 when node performance and node efficiency are balanced in different ways. Accordingly, as shown, each performance test assignment provided to UE device 200 at each of geolocations 502 includes assigned performance tests targeting the most efficient edge compute node in the vicinity (i.e., node 304-L1), as well as one or more local nodes (i.e., nodes 304-L3) that may provide less efficiency and better performance. Additionally, many of the performance test assignments shown in FIG. 6 to be provided to UE device 200 at geolocations 502 also assign performance tests targeting an intermediate node (i.e., node 304-L2) that may provide an optimal balance of performance and efficiency for certain geolocations and certain situations.

In addition to assigning nodes 304 based on geography and category variety as described above, system 100 may further take other factors into account in selecting which nodes 304 are assigned as targets of performance tests from a particular geolocation 502. For example, nodes 304 may be selected due to being relatively newly-deployed nodes 304 for which a robust set of data has not yet been gathered. In a similar manner, even if a node 304 is not newly deployed, the node 304 may be selected as a target of a test if there is relatively little or no data about performance of the node 304 for a particular geolocation or for particular circumstances (e.g., at a particular time of day, day of the week, time of the month, season of the year, etc.). By strategically selecting which nodes 304 to assign for performance tests to target for different geolocations, system 100 may ensure that sufficient test data will be accumulated over time to create a robust and useful geolocation-indexed performance dataset, as will be described in more detail below.

Along with indicating which nodes 304 are to be targeted by respective performance tests from a particular geolocation 502, a performance test assignment provided and received in Operation 2 may also include instructions indicative of the specific tests or types of testing that are to be performed for each targeted node 304. For instance, in some examples, UE device 200 may be directed to perform the same performance test (or tests) for each target node 304 that is assigned. In other examples, different types of performance tests (latency tests, processing metric tests, etc.) may be assigned individually for different target nodes 304 in accordance with what data system 100 determines to be needed to improve a geolocation-indexed performance dataset or in accordance with other suitable criteria.

Returning to FIG. 4, Operation 3 is depicted by arrows from UE device 200 to each of various nodes 304 that are shown in FIG. 4. These arrows depicting Operation 3 will be understood to represent the performing by UE device 200 of the assigned performance tests targeting each of the assigned target nodes 304 in the performance test assignment of Operation 2. For example, as illustrated above in relation to FIG. 6, if UE device 200 were at geolocation 502-1, the assigned target nodes 304 may include nodes 304-L3-8, 304-L3-9, and 304-L1. As another example, if UE device 200 were located at geolocation 502-2, the assigned target nodes 304 may include nodes 304-L3-8, 304-L3-9, 304-L3-10, 304-L1, and 304-L2.

Performance test may refer to any test performed by a particular UE device (e.g., a test UE device such as UE device 200) with respect to a particular edge compute node (e.g., one of the assigned target nodes 304) to determine the performance of the edge compute node with respect to a particular geolocation and/or other circumstances. For example, a performance test may involve pinging the node 304 (e.g., sending a small amount of data to the node 304 and immediately receiving a small amount of data from the node 304) from the geolocation at which the UE device is located in order to measure the latency of the node 304 with respect to the particular geolocation. In some examples, performance tests may be configured to not only detect performance (e.g., latency performance, etc.) of a target node 304 with respect to the geolocation of the test UE device, but may also detect performance with respect to other circumstances. For instance, performance tests may be assigned and performed to detect performance of different target nodes 304 with respect to circumstances like time (e.g., time of day, day of the week, time of the month, season of the year, etc.), data usage patterns, resource availability, and so forth.

Performance tests targeting a particular node 304 may include or be implemented by any suitable type of test to detect any suitable aspect of the performance of the target node 304. For instance, one exemplary performance test may be a latency test configured to detect a latency associated with an edge compute task performed by the particular node 304 when UE device 200 is at a particular geolocation. A latency test may be performed in any suitable way to determine any type of one-way or round-trip latency including travel-time latency (i.e., the transport time that it takes for a signal to propagate across a portion of communication network 302), radio latency (i.e., the incidental delay added by components of communication network 302 as the signal is transmitted and/or received), processing latency (i.e., the amount of time to queue an edge compute task at the selected node 304, perform appropriate computations in accordance with the task, and begin transmitting data back to UE device 200), or any other type of latency as may exist and be measurable in the system. For instance, in some examples, latency tests may be performed by sending and/or receiving timestamped data and determining how long it takes for this data to traverse communication network 302, to be processed, or the like.

Another exemplary performance test may be a processing metric test configured to detect a processing metric associated with an edge compute task performed by the particular node 304 when UE device 200 is at the particular geolocation. A processing metric test may be performed in any suitable way to determine how long a particular edge compute task (e.g., a benchmark edge compute task used only for testing purposes, an actual edge compute task associated with a real mobile application, etc.) takes to perform, including or not including latencies associated with data transfer to and from the node 304. As such, a processing metric test may determine how accurately and quickly a test node 304 is able to queue, schedule, and process an edge compute task using computing resources that are available at a particular time when the test is performed or under other circumstances.

Other exemplary performance tests may also be assigned and performed to detect other aspects of edge compute node performance. For example, a bandwidth test may be performed in any suitable way to determine how much data may be processed as a function of time by a particular node. In still other examples, other types of performance tests to detect other types of performance metrics and/or measure other aspects of the performance of a target edge compute node may similarly be performed as may serve a particular implementation.

In some examples, UE device 200 may be in motion when a performance test assignment is received and as assigned performance tests are performed. For example, while UE device 200 may be located at a particular geolocation 502 when the performance test assignment is received, UE device 200 may be moving along path 504 so as to be at a slightly different geolocation along the path by the time each of the performance tests can be performed. To the extent possible, it may be desirable for UE device 200 to perform each of the assigned tests included in a performance test assignment while at the same geolocation (e.g., one of geolocations 502). However, to the extent that this is not possible due to movement of UE device 200 as performance tests are being performed, each performance test may be associated with a specific geolocation of UE device 200 when the specific performance test was performed.

In response to performing a particular performance test targeting a particular target node 304 that UE device 200 was assigned to test from a particular geolocation, UE device 200 may be configured to provide performance data to the particular node 304. Specifically, the performance data may be representative of performance metrics generated as part of the performing of the performance test and the geolocation at which the UE device was located during the performing of the performance test. Performance metrics of a performance test may indicate things like the latency experienced by the test UE device when using the edge compute node, how accurately and/or fast various edge compute tasks of the performance test were executed, and any other performance metrics as may be tested in a particular implementation. For example, if the performance test was a latency test, the performance metric represented in the performance data may include results of the latency test that represent the detected latency, or, if the performance test was a processing metric test, the performance metric represented in the performance data may include results of the processing metric test that represent the detected processing metric.

Performance data including performance metrics and geolocation data representative of the geolocation of UE device 200 during the performance test may be generated by UE device 200 for each performance test assigned and performed. In some examples, UE device 200 may store or aggregate such performance data and/or may provide this performance data directly to system 100 for use in generating a geolocation-indexed performance dataset. However, rather than each test UE device 200 aggregating and providing performance data for many different nodes 304, it may be more efficient and effective for each node 304 to aggregate and provide its own performance data to system 100.

Accordingly, in certain examples, after generating the performance data associated with a particular performance test targeting a particular node 304, UE device 200 may be configured to provide the performance data to the particular node 304 so that the node 304 can aggregate the performance data together with performance data from other performance tests associated with other circumstances (e.g., performed from other geolocations, performed at other times of day or on other days of the week, etc.). For example, the other performance tests may be performed by other test UE devices 200, or by the same UE device 200 from a different geolocation and/or at a different time. In this way, each node 304 may aggregate (e.g., collect, store, manage, etc.) both current and historical performance data for a variety of geolocations and circumstances, thereby allowing system 100 to generate a geolocation-indexed performance dataset based on the performance data provided to system 100 by each respective node 304.

To illustrate an example of the type of data that a particular node 304 may aggregate and manage, FIG. 7 shows exemplary aggregated performance data 700 that is managed by one of nodes 304 and that may be accessed by system 100 from the node 304. As shown, performance data 700 may be associated with a particular node 304, which may be identified by an identification ("Edge Compute Node ID") and other data as may serve a particular implementation ("Edge Compute Node Metadata"). As represented by the various columns shown in FIG. 7, performance data 700 may include performance data for a plurality of tests (each identified with a different "Test #") performed by various UE devices 200 (each identified with a particular "UE Device ID #") at particular geolocations (each identified by coordinates of a "Location"). Performance metrics detected as a result of each test may be recorded within performance data 700, such as a detected latency metric ("Measured Latency") or other suitable performance metrics (e.g., processing performance metrics, bandwidth metrics, etc.). Performance metrics may also be recorded to include information such as a timestamp indicative of a time and data when the performance test was performed ("Test Timestamp").

The data shown in FIG. 7 will be understood to be mock data for the purposes of illustration, but will also be understood to be representative of various types of real data that could be used in a particular implementation. For example, while each instance of geolocation data shown in FIG. 7 is illustrated with mock x and y coordinates (e.g., "(x1, y1)," "(x2, y2)," etc.), it will be understood that performance data may represent geolocations for each respective performance test using latitude and longitude coordinates, global positioning system ("GPS") coordinates, or any other geolocation coordinates as may serve a particular implementation. As another example, while each test timestamp shown includes mock "hour:minute:second" times of day and a "month/day/year" dates, timestamps with any degree of precision (e.g., including millisecond precision in certain examples) may be used to indicate the respective time when each performance test was performed.

Additionally, while various categories are shown in FIG. 7 to illustrate exemplary types of data that may be aggregated and stored by each node 304, it will be understood that any suitable type of data may be detected, tested for, generated, aggregated, managed, stored, and/or provided by each node 304 as may serve a particular implementation, whether or not each of these types of data is illustrated in the example of FIG. 7. For instance, along with the "Measured Latency" metric, which may represent an overall latency metric that incorporates travel time latency and processing latency for a certain edge compute task, any other performance metrics associated with any other suitable performance tests described herein or as may serve a particular implementation could also be included in performance data 700. For example, round-trip or one-way latency metrics associated only with travel-time latency and/or radio latency, processing performance metrics, and/or other key performance indicators ("KPIs") may each be the subject of a particular performance test and may hence be stored and maintained among performance data 700. Other performance tests and corresponding data included within performance data 700 may relate to, among other things, real-time utilization of the particular node 304 (e.g., a number of other tasks executing on the node 304 when the test is performed, the availability of specific processing resources of the node

304, RF usage of communication resources of the node 304, etc.), characteristics (e.g., signal strength, processing resources, battery life, etc.) of the UE device 200 performing the performance test, prediction accuracy (e.g., the difference between an initial performance estimate and the actual performance detected), edge compute node metadata (e.g., static or dynamic characterization data or metadata associated with the node 304 include the geolocation of the node 304, the processing capabilities of the node 304, or the like), a distance between the geolocation of the node 304 and the UE device 200, and so forth.

As shown in FIG. 7, the aggregated performance data for a particular node 304 may include data from which system 100 may detect patterns and otherwise analyze the performance of the node 304 in a manner that allows for performance insights and predictions to be determined (e.g., using machine learning and/or other technologies). For example, as shown in FIG. 7, tests 1, 2, and 3 are all performed from approximately the same geolocation (i.e., "(x1, y1)") at three different times in the middle of the night (i.e., between 1:17 AM and 6:38 AM), and the measured latency stays approximately the same. This may provide a datapoint for system 100 to determine that this latency (e.g., approximately 23 ms) may consistently be expected from this geolocation, at least during nighttime hours. As another example, four different UE devices 200 (i.e., devices with IDs 1009, 1002, 1003, and 1004) are shown to perform tests targeting this node 304 from the geolocation labeled "(x7, y7)," but are shown to detect a relatively wide range of measured latencies (e.g., from 8 ms to 19 ms). System 100 may look to the timestamps of each test to help make sense of this discrepancy. For example, by comparing this data with data from other similar tests performed on other days, system 100 may determine that there are peak hours from approximately 6:00 PM to 8:00 PM on weekdays (e.g., after people finish with the workday), and that latency metrics for this node 304 can be expected to be higher during these peak hours than during the workday or later in the evening. Various other patterns and insights may similarly be derived from the data shown in FIG. 7 and from other performance data aggregated over a long period of time (e.g., several days, weeks, months, or years) in any manner as may serve a particular implementation.

Returning to FIG. 4, Operation 4 is depicted by respective arrows extending from each of the various nodes 304 in FIG. 4 to system 100. These arrows depicting Operation 4 will be understood to represent the accessing of the performance data from each of the nodes 304 (e.g., including performance data 700 from one of the nodes 304) by system 100. The accessing of the performance data in Operation 4 may be performed by system 100 subsequent to the providing of the performance test assignment in Operation 2 and subsequent to the performing of the performance tests targeting the nodes 304 in Operation 3. This accessing of the performance data may be performed in any suitable way. For example, system 100 may request raw performance data (e.g., data such as illustrated in FIG. 7) from each node 304 over communication network 302, and may receive the raw performance data in any suitable format. In other examples, system 100 may request and receive only updates that have been made to the performance data since the last time that the performance data was accessed, rather than necessarily requesting and receiving all the data aggregated and stored by nodes 304. In still other examples, system 100 may not request or receive raw data from nodes 304 but, rather, may access the performance data by receiving an analysis of the raw performance data that is performed by node 304. For instance, system 100 may receive data representative of averages of different metrics or other data summarizing the large amount of raw performance data aggregated by nodes 304, data representative of patterns or insights identified by nodes 304 based on the raw performance data, or the like.

Having performed Operation 4 to access the performance data in any of these ways or another suitable way, system 100 may perform Operation 5 to generate, based on the accessed performance data, a geolocation-indexed performance dataset corresponding to a geographic area covered by communication network 302. Rather than being depicted using one or more arrows like Operations 1-4, FIG. 4 shows that Operation 5 is depicted as a circle in system 100 that will be understood to be representative of the processing performed by system 100 to consolidate all the accessed performance data from all the nodes 304 to generate the geolocation-indexed performance dataset. A geolocation-indexed performance dataset may refer to a dataset that includes data for various performance metrics that have been detected (e.g., based on performance tests assigned to various UE devices 200 while the UE devices 200 were at various different geolocations) and that are managed and maintained in a manner that the performance metric data may be indexed (e.g., looked up, hashed, referenced, etc.) by geolocation, rather than (or in addition to), for example, being indexed by edge compute node or the like. In this way, a geolocation-indexed performance dataset may be configured to indicate, for various geolocations within a particular geographic area covered by a particular communication network, how different edge compute nodes are likely to perform. Geolocation-indexed performance datasets are at least partially based on prior detected performance (e.g., from previously conducted performance tests targeting edge compute nodes on the communication network) under certain circumstances such as from test UE devices located at particular geolocations, at certain times of the day or week, at certain times of the year, or the like.

In some examples, a geolocation-indexed performance dataset may incorporate certain pictorial aspects (e.g., pictorial aspects depicting geographical elements such as roads, topography, bodies of land and water, fixed geolocations of edge compute nodes, etc.), and, as such, may be referred to as a performance map. Other geolocation-indexed performance datasets may be implemented as, or may include, various types of non-pictorial data structures such as a look-up-table or the like that includes entries for each of a plurality of geolocations. Regardless of the implementation details, data making up a geolocation-indexed performance dataset may be efficiently used (e.g., by system 100 or other systems for any of the use cases described herein) to assess a communication network from the perspective of an arbitrary geolocation within the footprint of the communication network. For example, given coordinates for a particular geolocation, a geolocation-indexed performance dataset may be used to easily and efficiently determine how different edge compute nodes may be expected to perform for a UE device at that geolocation (e.g., if a UE device were to have an edge compute task to assign to an edge compute node from that geolocation at a particular time).

Figure 8:
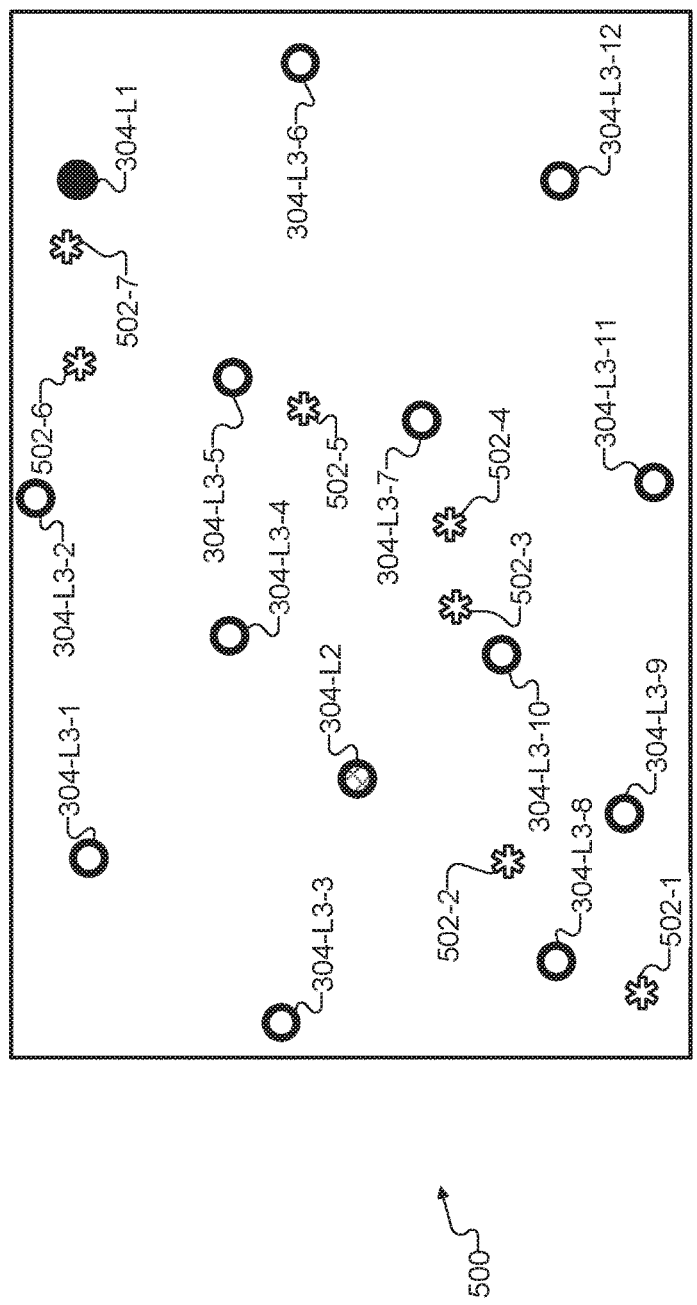
FIG. 8 illustrates an exemplary geolocation-indexed performance dataset corresponding to the geographic area of FIG. 5 according to principles described herein.
Figure 8:
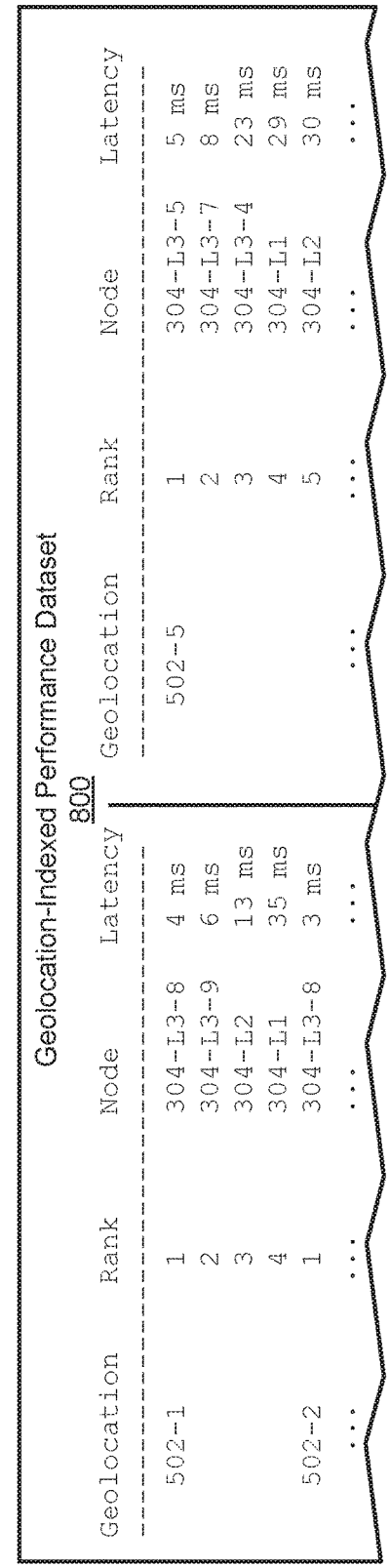

FIG. 8 illustrates an exemplary geolocation-indexed performance dataset 800 corresponding to geographic area 500, which was described above. In FIG. 8, a pictorial depiction of geographic area 500 is shown to indicate, in a traditional pictorial map format, the respective geolocations of each of geolocations 502 and nodes 304, which have been described above. While geolocations 502 are shown in FIG. 8 as exemplary geolocations within geographic area 500, it will be understood that geolocation-indexed performance dataset 800 may be configured to include data for any geolocations within geographic area 500 as may serve a particular implementation. For example, geographic area 500 may be divided into a grid having a plurality of subsections (e.g., hundreds or thousands of subsections, or any other suitable number) that each act as a geolocation in geolocation-indexed performance dataset 800. As another example, the number and location of the geolocations accounted for by geolocation-indexed performance dataset 800 may grow and change as more performance tests are run from more geolocations, and as more performance data corresponding to a greater number of geolocations within geographic area 500 is aggregated and accessed to be used to generate and update (e.g., integrate more performance data into) geolocation-indexed performance dataset 800.

For each geolocation accounted for by geolocation-indexed performance dataset 800, a plurality of edge compute nodes may be associated with the geolocation based on certain respective performance metrics that, in some examples, may allow the edge compute nodes to be ranked in order of performance. For example, as shown, each item shown in the "Location" column of geolocation-indexed performance dataset 800 is shown to correspond to a ranked list (see "Rank" column) of edge compute nodes (see "Node" column, listing various specific nodes 304) and their respective latency metrics (e.g., average latency metrics or other suitable metrics represented in the "Latency" column and/or other performance columns not explicitly shown). For example, as shown, geolocation-indexed performance dataset 800 indicates that the first ranked, highest-performing edge compute node for geolocation 502-1 has been measured to be node 304-L3-8 with an average latency of 4 ms, followed by node 304-L3-9 at 6 ms, node 304-L2 at 13 ms, and node 304-L1 at 35 ms. As another example, geolocation-indexed performance dataset 800 indicates that the first ranked, highest-performing edge compute node for geolocation 502-5 has been measured to be node 304-L3-5 within average latency of 5 ms, followed by node 304-L3-7 at 8 ms, node 304-L3-4 at 23 ms, node 304-L1 at 29 ms, and node 304-L2 at 30 ms. Other ranked edge compute nodes for other geolocations will be understood to also be included within geolocation-indexed performance dataset 800, although such are not shown in FIG. 8.

It may not be practical to rank every possible edge compute node for each possible geolocation. Accordingly, as shown in geolocation-indexed performance dataset 800, only a few of the top ranked nodes may be indicated in geolocation-indexed performance dataset 800 while others are omitted. For example, as shown, geolocation-indexed performance dataset 800 does not indicate a rank or performance for node 304-L3-6 in connection with geolocation 502-1 because it is unlikely that a UE device located at geolocation 502-1 would have a reason to use node 304-L3-6 to perform an edge compute task. It is noted, however, that each ranked list of nodes for each geolocation represented in geolocation-indexed performance dataset 800 does include at least one node of each edge compute node category (i.e., one of each of nodes 304-L1, 304-L2, and 304-L3). In this way, geolocation-indexed performance dataset 800 may provide data indicative not only of the best expected performance for a particular geolocation, but also the best efficiency, such that the node performance and node efficiency goals can be balanced as described above.

While the relatively simple implementation of geolocation-indexed performance dataset 800 shown in FIG. 8 only indicates a latency performance metric for each node, it will be understood that more complex implementations of geolocation-indexed performance dataset 800 may account for any of the performance metrics described herein (e.g., allowing ranking to be based on any metric as may be appropriate or as may be selected by an entity using the geolocation-indexed performance dataset). Additionally, while geolocation-indexed performance dataset 800 does not account for any UE device circumstances other than the geolocation, more complex implementations of geolocation-indexed performance dataset 800 may account for other circumstances of the UE device besides the geolocation for the UE device. For example, these geolocation-indexed performance datasets may indicate the rank and performance of various nodes from a particular geolocation at different times of day, week, month, or year, and/or with respect to other suitable circumstances and conditions (e.g., utilization, signal strength, battery life, etc.) as may serve a particular implementation.

As described above, Operation 5 may represent the generating of a geolocation-indexed performance dataset such as geolocation-indexed performance dataset 800. While this generating may include an initial creation of the geolocation-indexed performance dataset at a particular point in time, it will also be understood that geolocation-indexed performance dataset 800 may be a dynamic dataset configured to change and grow as circumstances may dictate. Accordingly, the generating of geolocation-indexed performance dataset 800 in Operation 5 may not only refer to the initial creation of geolocation-indexed performance dataset 800, but also to the continuous updating of geolocation-indexed performance dataset 800 as new and updated performance data is generated by test UE devices 200 and/or nodes 304, and as this updated performance data is accessed, processed, and integrated or incorporated into geolocation-indexed performance dataset 800 by system 100.

Once generated in Operation 5, geolocation-indexed performance dataset 800 may be used for a variety of applications and use cases by system 100, by other systems or devices, by various people performing various jobs or roles, or by any other entities as may be able to make use of the information provided by geolocation-indexed performance dataset 800 for a particular application. For instance, one use case that has been described above relates to the use of geolocation-indexed performance datasets by system 100 to selectively assign edge compute task to edge compute nodes on a communication network. Specifically, for example, system 100 may be configured to receive a task assignment request generated by a UE device that, like system 100, is also communicatively coupled to communication network 302. The UE device may be a standard UE device distinct from any test UE device (e.g., UE device 200) used to generate geolocation-indexed performance dataset 800. The task assignment request may be associated with an edge compute task that is to be performed in furtherance of an application executing on the UE device.

In addition to performing the operations described above, system 100 may further perform operations related to managing a node selection policy configured to facilitate a balancing of node performance and node efficiency for edge computing tasks that are to be assigned to be performed by selected edge compute nodes in the set of edge compute nodes. In some examples, based on performance data accessed in Operation 4, as well as based on a variety of other data (e.g., edge compute node characterization data, UE device characterization data, etc.) and/or information received from a variety of other tools (e.g., node monitoring tools, security monitoring tools, radio network information ("RNI") tools, etc.), system 100 may use machine learning technology and/or other technologies to generate and update the node selection policy. For instance, supervised machine learning techniques may be used to perform pattern recognition within sets of characterization data, classification of characterization data, regression analysis for characterization data, or the like. In some examples, classification and/or regression analysis may be performed using a k-nearest neighbors ("k-NN") algorithm or another suitable machine learning technique as may serve a particular implementation. System 100 may therefore be equipped, in response to the received task assignment request, to select, from the set of nodes 304, a particular node 304 for performance of the edge compute task. For example, system 100 may perform this selecting in accordance with the node selection policy and based on geolocation-indexed performance dataset 800 of geographic area 500. System 100 may then assign the edge compute task to be performed by the selected node 304, thereby balancing the competing goals of node performance and node efficiency as described above.

Other applications and use cases (e.g., use cases that do not directly involve selectively assigning tasks to edge compute nodes) may also be served by geolocation-indexed performance dataset 800. For example, as mentioned above, one exemplary use case for geolocation-indexed performance dataset 800 may involve providing geolocation-indexed performance dataset 800 to mobile application developers to assist them in developing plans for implementing or rolling out new mobile applications. For instance, geolocation-indexed performance dataset 800 may help identify the top ten cities where edge compute performance of a communication network would provide the most optimal experience for users of a new mobile application, and the mobile application could first be implemented, demonstrated, and subjected to trial runs in those cities. Similarly, a mobile application distributor may use a geolocation-indexed performance dataset to help predict how well a particular mobile application will work in a particular geographic area and what the user experience will be like. This may help the distributor make strategic decisions about how to distribute and market the application in particular geographies.

As another exemplary use case, a network service provider responsible for managing and developing communication network 302 may use geolocation-indexed performance dataset 800 to determine what geographic areas covered by communication network 302 tend to serve users well for the edge compute tasks being assigned, and what geographic areas might leave more room for improvement. For example, using geolocation-indexed performance dataset 800, the network service provider may be able to more easily and accurately determine strategy for where to deploy new network resources (e.g., where to add additional nodes 304, etc.) and where to bolster and/or improve network resources (e.g., which nodes 304 are overutilized and in need of additional processing resources to help keep up with demand, etc.). Still other use cases may relate to general network assurance uses cases (e.g., general applications for monitoring network performance, etc.), and so forth.

Figure 9:
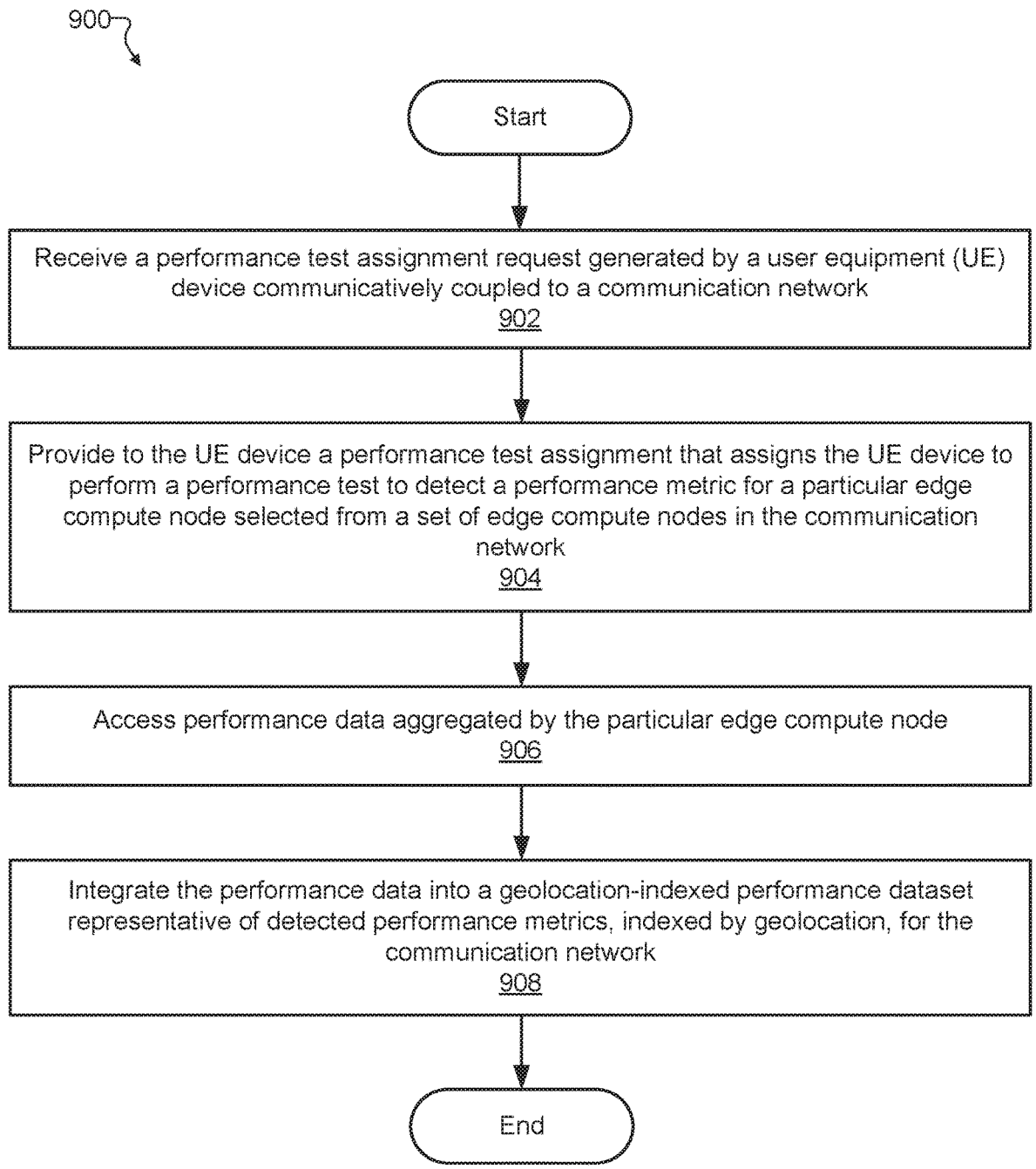
FIG. 9 illustrates an exemplary method for generating and managing multi-access edge computing performance data according to principles described herein.
Figure 10:
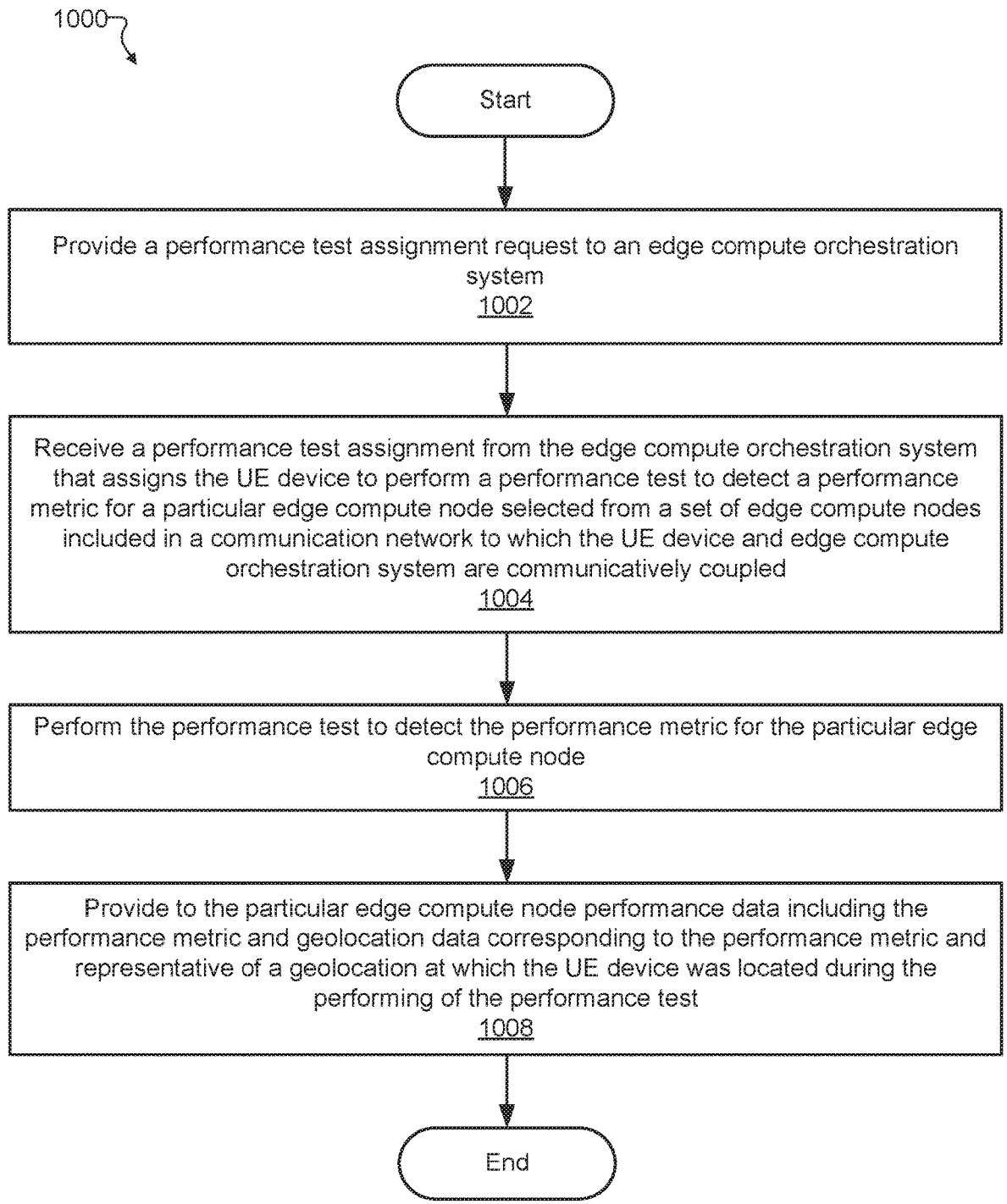
FIG. 10 illustrates an exemplary method for generating and managing multi-access edge computing performance data according to principles described herein.

FIGS. 9 and 10 illustrate respective exemplary methods for generating and managing multi-access edge computing performance data. More particularly, FIG. 9 illustrates an exemplary method 900 configured to be performed by system 100, any components included therein, and/or any implementation thereof, while FIG. 10 illustrates an exemplary method 1000 configured to be performed by UE device 200, any components included therein, and/or any implementation thereof. While FIGS. 9 and 10 each illustrate exemplary operations according to one embodiment, it will be understood that other embodiments may omit, add to, reorder, and/or modify any of the operations shown in FIG. 9 or 10.

Referring to method 900 of FIG. 9, in operation 902, an edge compute orchestration system that is communicatively coupled with a set of edge compute nodes in a communication network may receive a performance test assignment request. For example, the performance test assignment may be generated by a user equipment device communicatively coupled to the communication network. Operation 902 may be performed in any of the ways described herein.

In operation 904, the edge compute orchestration system may provide a performance test assignment to the UE device in response to the performance test assignment request received in operation 902. For instance, the performance test assignment may assign the UE device to perform a performance test to detect a performance metric for a particular edge compute node selected from the set of edge compute nodes. Operation 904 may be performed in any of the ways described herein.

In operation 906, the edge compute orchestration system may access performance data aggregated by the particular edge compute node assigned as the target of the performance test in operation 904. For example, the edge compute orchestration system may access the performance data subsequent to the providing of the performance test assignment in operation 904 and subsequent to the performance test being performed by the UE device to detect the performance metric for the particular edge compute node. In certain examples, the performance data accessed in operation 906 may include the performance metric, as well as geolocation data corresponding to the performance metric and representative of a geolocation of the UE device during the performance of the performance test. Operation 906 may be performed in any of the ways described herein.

In operation 908, the edge compute orchestration system may integrate the performance data accessed in operation 906 into a geolocation-indexed performance dataset representative of detected performance metrics, indexed by geolocation, for the communication network. Operation 908 may be performed in any of the ways described herein.

Referring now to method 1000 of FIG. 10, in operation 1002, a UE device (e.g., a test UE device) communicatively coupled to a communication network that includes a set of edge compute nodes each communicatively coupled with an edge compute orchestration system may provide a performance test assignment request to the edge compute orchestration system. Operation 1002 may be performed in any of the ways described herein.

In operation 1004, the UE device may receive a performance test assignment from the edge compute orchestration system in response to the performance test assignment request provided in operation 1002. For example, the performance test assignment may assign the UE device to perform a performance test to detect a performance metric for a particular edge compute node selected from the set of edge compute nodes. Operation 1004 may be performed in any of the ways described herein.

In operation 1006, the UE device may perform the performance test to detect the performance metric for the particular edge compute node. For example, the UE device may perform the performance test in accordance with the performance test assignment and when the UE device is located at a particular geolocation. Operation 1006 may be performed in any of the ways described herein.

In operation 1008, the UE device may provide performance data to the particular edge compute node in response to the performing of the performance test in operation 1006. For instance, the UE device may provide performance data that includes the performance metric detected as part of the performing of the performance test. The performance data may also include geolocation data corresponding to the performance metric and representative of the geolocation at which the UE device was located during the performing of the performance test. In some examples, this performance data may be configured to be integrated, by the edge compute orchestration system, into a geolocation-indexed performance dataset representative of detected performance metrics, indexed by geolocation, for the communication network. Operation 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
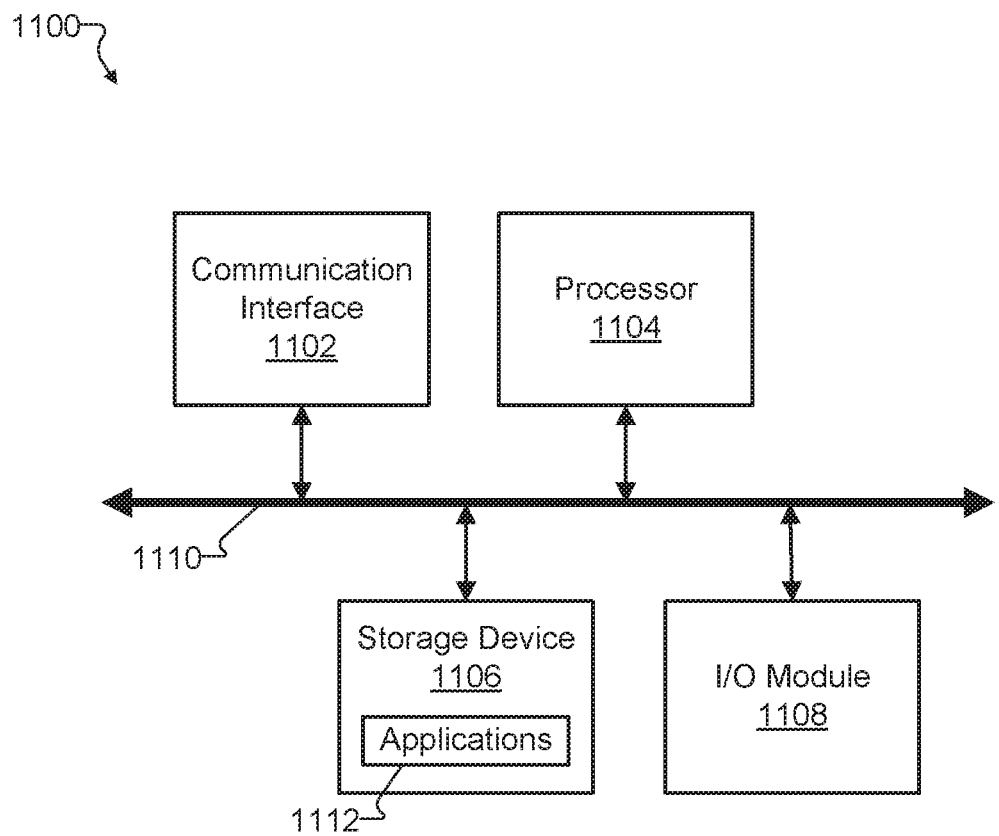
FIG. 11 illustrates an exemplary computing device according to principles described herein.

FIG. 11 illustrates an exemplary computing device 1100 that may be specifically configured to perform one or more of the processes described herein. For example, computing device 1100 may include multi-access edge computing technologies (e.g., a virtualization layer, a hypervisor, an edge controller, etc.) to implement a system such as system 100 or an edge compute node 204, or may implement any of the other computing devices (e.g., UE device 200, etc.) described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct an implementation of processor 1104 to perform one or more processes or functions associated with processing facility 104 of system 100 or with processing facility 204 of UE device 200. Likewise, storage facility 102 of system 100 and storage facility 202 of UE device 200 may each be implemented by or within an implementation of storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by an edge compute orchestration system that is communicatively coupled with a set of edge compute nodes in a communication network, a performance test assignment request generated by a user equipment (UE) device communicatively coupled to the communication network;
   providing, by the edge compute orchestration system to the UE device in response to the performance test assignment request, a performance test assignment that assigns the UE device to perform a performance test to detect a performance metric for a particular edge compute node selected from the set of edge compute nodes;
   accessing, by the edge compute orchestration system subsequent to the providing of the performance test assignment, performance data aggregated by the particular edge compute node, the performance data including the performance metric and geolocation data corresponding to the performance metric and representative of a geolocation of the UE device during the performance of the performance test; and
   integrating, by the edge compute orchestration system, the accessed performance data into a geolocation-indexed performance dataset representative of detected performance metrics, indexed by geolocation, for the communication network.

2. The method of claim 1, wherein:
   the performance test assignment provided to the UE device assigns the UE device to perform a plurality of performance tests targeting a subset of edge compute nodes selected from the set of edge compute nodes, the plurality of performance tests including the performance test and at least one other performance test to detect an additional performance metric for at least one other edge compute node distinct from the particular edge compute node and selected from the set of edge compute nodes; and
   the method further comprises
   accessing, by the edge compute orchestration system, additional performance data aggregated by the at least one other edge compute node, the additional performance data including the additional performance metric and additional geolocation data corresponding to the additional performance metric and representative of a geolocation of the UE device during the performance of the at least one other performance test; and
   integrating, by the edge compute orchestration system, the additional performance data into the geolocation-indexed performance dataset.

3. The method of claim 1, wherein the performance test is a latency test configured to detect, as the performance metric, a latency associated with an edge compute task performed by the particular edge compute node when the UE device is at the geolocation.

4. The method of claim 1, wherein the performance test is a processing metric test configured to detect, as the performance metric, a processing metric associated with an edge compute task performed by the particular edge compute node when the UE device is at the geolocation.

5. The method of claim 1, wherein:
   the performance data further includes a timestamp indicative of when the performance test was performed; and
   the geolocation-indexed performance dataset is representative of detected performance metrics for the communication network at various times of day, week, or year.

6. The method of claim 1, further comprising:
   receiving, by the edge compute orchestration system, a task assignment request generated by a second UE device distinct from the UE device and also communicatively coupled to the communication network, the task assignment request associated with an edge compute task that is to be performed in furtherance of an application executing on the second UE device;
   managing, by the edge compute orchestration system, a node selection policy configured to facilitate a balancing of node performance and node efficiency for edge computing tasks that are to be assigned to be performed by selected edge compute nodes in the set of edge compute nodes;
   selecting, by the edge compute orchestration system from the set of edge compute nodes, an edge compute node for performance of the edge compute task, the selecting performed in response to the received task assignment request,
      in accordance with the node selection policy, and
      based on the geolocation-indexed performance dataset; and
   assigning, by the edge compute orchestration system, the edge compute task to be performed by the selected edge compute node.

7. The method of claim 1, embodied as computer-executable instructions on at least one non-transitory computer-readable medium.

8. A method comprising:
   providing, by a user equipment (UE) device communicatively coupled to a communication network that includes a set of edge compute nodes each communicatively coupled with an edge compute orchestration system, a performance test assignment request to the edge compute orchestration system;

receiving, by the UE device from the edge compute orchestration system in response to the performance test assignment request, a performance test assignment that assigns the UE device to perform a performance test to detect a performance metric for a particular edge compute node selected from the set of edge compute nodes;

performing, by the UE device in accordance with the performance test assignment and when the UE device is located at a geolocation, the performance test to detect the performance metric for the particular edge compute node; and providing, by the UE device to the particular edge compute node in response to the performing of the performance test, performance data including the performance metric and geolocation data corresponding to the performance metric and representative of the geolocation at which the UE device was located during the performing of the performance test, the performance data configured to be integrated, by the edge compute orchestration system, into a geolocation-indexed performance dataset representative of detected performance metrics, indexed by geolocation, for the communication network.

9. The method of claim 8, wherein:

the performance test assignment received from the edge compute orchestration system assigns the UE device to perform a plurality of performance tests targeting a subset of edge compute nodes selected from the set of edge compute nodes, the plurality of performance tests including the performance test and at least one other performance test to detect an additional performance metric for at least one other edge compute node distinct from the particular edge compute node and selected from the set of edge compute nodes;

the method further comprises:
performing, by the UE device in accordance with the performance test assignment and when the UE device is located at the geolocation, the at least one other performance test to detect the additional performance metric for the at least one other edge compute node, and providing, by the UE device to the at least one other edge compute node in response to the performing of the at least one other performance test, additional performance data including the additional performance metric and additional geolocation data corresponding to the additional performance metric and representative of the geolocation, the additional performance data configured to be further integrated, by the edge compute orchestration system, into the geolocation-indexed performance dataset.

10. The method of claim 8, wherein the performing of the performance test includes performing a latency test configured to detect, as the performance metric, a latency associated with an edge compute task performed by the particular edge compute node when the UE device is at the geolocation.

11. The method of claim 8, wherein the performing of the performance test includes performing a processing metric test configured to detect, as the performance metric, a processing metric associated with an edge compute task performed by the particular edge compute node when the UE device is at the geolocation.

12. The method of claim 8, further comprising providing, by the UE device to the particular edge compute node in response to the performing of the performance test and together with the performance data including the performance metric and the geolocation data, additional performance data representative of a timestamp indicative of when the performance test was performed;

wherein the additional performance data is further configured to be integrated, by the edge compute orchestration system, into the geolocation-indexed performance dataset to be representative of detected performance metrics for the communication network at various times of day, week, or year.

13. The method of claim 8, wherein the providing of the performance test assignment request is automatically and periodically repeated as the UE device is moved among various geolocations in a geographic area covered by the communication network.

14. The method of claim 8, embodied as computer-executable instructions on at least one non-transitory computer-readable medium.

15. An edge compute orchestration system comprising:
a memory storing instructions; and
a processor communicatively coupled to the memory and to a set of edge compute nodes in a communication network, the processor configured to execute the instructions to:
receive a performance test assignment request generated by a user equipment (UE) device communicatively coupled to the communication network;
provide, to the UE device in response to the performance test assignment request, a performance test assignment that assigns the UE device to perform a performance test to detect a performance metric for a particular edge compute node selected from the set of edge compute nodes;
access, subsequent to the providing of the performance test assignment, performance data aggregated by the particular edge compute node, the performance data including the performance metric and geolocation data corresponding to the performance metric and representative of a geolocation of the UE device during the performance of the performance test; and
integrate the accessed performance data into a geolocation-indexed performance dataset representative of detected performance metrics, indexed by geolocation, for the communication network.

16. The edge compute orchestration system of claim 15, wherein:
the performance test assignment provided to the UE device assigns the UE device to perform a plurality of performance tests targeting a subset of edge compute nodes selected from the set of edge compute nodes, the plurality of performance tests including the performance test and at least one other performance test to detect an additional performance metric for at least one other edge compute node distinct from the particular edge compute node and selected from the set of edge compute nodes; and the processor is further configured to
execute the instructions to access additional performance data aggregated by the at least one other edge compute node, the additional performance data including the additional performance metric and additional geolocation data corresponding to the additional performance metric and representative of a geolocation of the UE device during the performance of the at least one other performance test; and
integrate the additional performance data into the geolocation-indexed performance dataset.

17. The edge compute orchestration system of claim 15, wherein the processor is further configured to execute the instructions to:
- receive a task assignment request generated by a second UE device distinct from the UE device and also communicatively coupled to the communication network, the task assignment request associated with an edge compute task that is to be performed in furtherance of an application executing on the second UE device;
- manage a node selection policy configured to facilitate a balancing of node performance and node efficiency for edge computing tasks that are to be assigned to be performed by selected edge compute nodes in the set of edge compute nodes;
- select, from the set of edge compute nodes, an edge compute node for performance of the edge compute task, the selecting performed
  - in response to the received task assignment request,
  - in accordance with the node selection policy, and
  - based on the geolocation-indexed performance dataset; and
- assign the edge compute task to be performed by the selected edge compute node.

18. A user equipment (UE) device comprising:
- a memory storing instructions; and
- a processor communicatively coupled to the memory and to a communication network that includes a set of edge compute nodes each communicatively coupled with an edge compute orchestration system, the processor configured to execute the instructions to:
  - provide a performance test assignment request to the edge compute orchestration system;
  - receive, from the edge compute orchestration system in response to the performance test assignment request, a performance test assignment that assigns the UE device to perform a performance test to detect a performance metric for a particular edge compute node selected from the set of edge compute nodes;
  - perform, in accordance with the performance test assignment and when the UE device is located at a geolocation, the performance test to detect the performance metric for the particular edge compute node; and
  - provide, to the particular edge compute node in response to the performing of the performance test, performance data including the performance metric and geolocation data corresponding to the performance metric and representative of the geolocation at which the UE device was located during the performing of the performance test, the performance data configured to be integrated, by the edge compute orchestration system, into a geolocation-indexed performance dataset representative of detected performance metrics, indexed by geolocation, for the communication network.

19. The UE device of claim 18, wherein:
- the performance test assignment received from the edge compute orchestration system assigns the UE device to perform a plurality of performance tests targeting a subset of edge compute nodes selected from the set of edge compute nodes, the plurality of performance tests including the performance test and at least one other performance test to detect an additional performance metric for at least one other edge compute node distinct from the particular edge compute node and selected from the set of edge compute nodes;
- the processor is further configured to execute the instructions to:
  - perform, in accordance with the performance test assignment and when the UE device is located at the geolocation, the at least one other performance test to detect the additional performance metric for the at least one other edge compute node, and
  - provide, to the at least one other edge compute node in response to the performing of the at least one other performance test, additional performance data including the additional performance metric and additional geolocation data corresponding to the additional performance metric and representative of the geolocation, the additional performance data configured to be further integrated, by the edge compute orchestration system, into the geolocation-indexed performance dataset.

20. The UE device of claim 18, wherein the providing of the performance test assignment request is automatically and periodically repeated as the UE device is moved among various geolocations in a geographic area covered by the communication network.

\* \* \* \* \*